(12) United States Patent
Arata et al.

(10) Patent No.: US 10,437,642 B2
(45) Date of Patent: Oct. 8, 2019

(54) MANAGEMENT SYSTEM FOR COMPUTER SYSTEM

(71) Applicant: HITACHI, LTD., Tokyo (JP)

(72) Inventors: Shigeki Arata, Tokyo (JP); Tomohito Uchida, Tokyo (JP); Yutaka Tawara, Tokyo (JP); Yoshifumi Takamoto, Tokyo (JP); Yuri Hiraiwa, Tokyo (JP)

(73) Assignee: HITACHI, LTD., Tokyo (JP)

( * ) Notice: Subject to any disclaimer, the term of this patent is extended or adjusted under 35 U.S.C. 154(b) by 217 days.

(21) Appl. No.: 15/553,603

(22) PCT Filed: Apr. 22, 2015

(86) PCT No.: PCT/JP2015/062279
§ 371 (c)(1),
(2) Date: Aug. 25, 2017

(87) PCT Pub. No.: WO2016/170625
PCT Pub. Date: Oct. 27, 2016

(65) Prior Publication Data
US 2018/0046509 A1 Feb. 15, 2018

(51) Int. Cl.
*G06F 9/50* (2006.01)
*G06F 9/455* (2018.01)
(Continued)

(52) U.S. Cl.
CPC .......... *G06F 9/50* (2013.01); *G06F 9/45558* (2013.01); *G06F 9/46* (2013.01); *H04L 41/50* (2013.01); *H04L 67/10* (2013.01)

(58) Field of Classification Search
CPC ........ G06F 9/50; G06F 9/5005; G06F 9/5011; G06F 9/5027; G06F 9/45558;
(Continued)

(56) References Cited

U.S. PATENT DOCUMENTS 9,942,114 B1* 4/2018 Arora ..................... G06F 11/30
2013/0066940 A1* 3/2013 Shao .................... H04L 67/1025
709/201

(Continued)

FOREIGN PATENT DOCUMENTS

| JP | 2014-023142 A | 2/2014 |
| WO | 2013/055601 A1 | 4/2013 |
| WO | 2014/155555 A1 | 10/2014 |

*Primary Examiner* — Emerson C Puente
*Assistant Examiner* — Zhi Chen
(74) *Attorney, Agent, or Firm* — Volpe and Koenig, P.C.

(57) ABSTRACT

A management system includes an interface device coupled to a computer system including a plurality of resources including resources of a plurality of resource types and a processor coupled to the interface device. The processor allocates, to a tenant environment, a resource of a resource type, which is different depending on an XaaS (X as a Service), among the plurality of resources including resources of a plurality of resource types and provides a plurality of tenant environments including a plurality of XaaSs. The processor manages, as low-order resources, resources lower in order than the resources allocated to the tenant environments, among the plurality of resources including resources of a plurality of resource types. When receiving a resource change request, the processor executes change processing on at least one of the low-order resources among the resources managed as low-order resources.

15 Claims, 24 Drawing Sheets

Tenant environment management table
1500

| Tenant environment ID (1501) | Service model name (1502) | Allocated resource ID (1503) | Dependence destination resource ID (1504) | High-order resource ID (1505) |
|---|---|---|---|---|
| T#1 | PaaS | OS#1 | VM1 | APP#1 |
| T#2 | VMaaS | VM#2 | CPU2, CPU3, Memory2, LU2 | OS#2, APP#2 |
| #T4 | STGaaS | CPU#4, CPU#5, Memory#3, LU#4 | - | LPAR#5, VM#5, OS#5, APP#5 |
| .... | .... | .... | .... | .... |

(51) Int. Cl.
*G06F 9/46* (2006.01)
*H04L 29/08* (2006.01)
*H04L 12/24* (2006.01)

(58) Field of Classification Search
CPC ..... H04L 41/50; H04L 41/5041; H04L 41/12; H04L 67/10; H04L 67/104; H04L 67/1087; H04L 67/1089
See application file for complete search history.

(56) References Cited

U.S. PATENT DOCUMENTS

2014/0006627 A1\* 1/2014 Arwe ................ H04L 29/08468
  709/226
2014/0025816 A1 1/2014 Otani \* cited by examiner

FIG. 14

Tenant management table
1400

| Tenant ID | Tenant name | Tenant detail | Tenant environment ID | Charged amount |
|---|---|---|---|---|
| Tenant#1 | KK | XXXX | T#1 | AAA $ |
| Tenant#2 | SS | XXXX | T#2 | BBB$ |
| .... | .... | .... | .... | .... |

Tenant environment management table
1500

| Tenant environment ID | Service model name | Allocated resource ID | Dependence destination resource ID | High-order resource ID |
|---|---|---|---|---|
| T#1 | PaaS | OS#1 | VM1 | APP#1 |
| T#2 | VMaaS | VM#2 | CPU2, CPU3, Memory2, LU2 | OS#2, APP#2 |
| #T4 | STGaaS | CPU#4, CPU#5, Memory#3, LU#4 | - | LPAR#5, VM#5, OS#5, APP#5 |
| .... | .... | .... | .... | .... |

Service model management table
1600

| Service model name | Allocated resource type |
|---|---|
| SaaS | APP |
| PaaS | OS |
| VMaaS | VM |
| LPARaaS | LPAR |
| STGaaS | CPU, Memory, LU |
| .... | .... |

1601 — Service model name
1602 — Allocated resource type

FIG. 17

Resource individual management table
1700

| Resource ID | Resource category | State | Detail |
|---|---|---|---|
| VM#2 | Tenant environment allocation | operating | XXXXX |
| .... | .... | .... | .... |
| Server#1 | Tenant environment allocation | operating | XXXXX |
| .... | .... | .... | .... |

1701 — Resource ID
1702 — Resource category
1703 — State
1704 — Detail

FIG. 18

Administrator management table
1800

| Administrator ID | Administrator type | Tenant environment ID |
|---|---|---|
| Administrator#1 | System administrator | .... |
| Administrator#2 | Tenant Administrator | T#1, T#2, T#4 |
| Administrator#3 | Tenant Administrator | T#3 |
| Administrator#4 | Tenant Administrator | T#5, T#6 |
| .... | .... | .... |

Tenant environment management table
1900

| Tenant environment ID | Service model name | Allocated resource ID | Dependence destination resource ID | High-order resource ID |
|---|---|---|---|---|
| T#1 | PaaS | OS#1 | VM1 | APP#1 |
| T#2 | VMaaS | VM#2 | CPU2, CPU3, Memory2, LU2 | OS#2, APP#2 |
| T#3 | VMaaS | VM#3 | CPU2, CPU3, Memory2, LU3 | OS#3, APP#3 |
| T#4 | STGaaS | CPU#4, CPU#5, Memory#3, LU#4 | - | LPAR#5, VM#5, OS#5, APP#5 |
| .... | .... | .... | | |

Resource management table
2000

| Resource type | Resource ID | Resource category | Dependence destination resource ID | State | Detail |
|---|---|---|---|---|---|
| APP | APP#1 | High-order resource | OS#1 | Operating | XXX |
| | APP#2 | High-order resource | OS#2 | Operating | XXX |
| | .... | .... | .... | .... | .... |
| OS | OS#1 | Tenant-environment allocated resource | VM#1 | Operating | XXX |
| | OS#2 | High-order resource | VM#2 | Operating | XXX |
| | .... | .... | .... | .... | .... |
| VM | VM#1 | Low-order resource | CPU#1, Memory#1, LU#1 | Operating | XXX |
| | VM#2 | Tenant-environment allocated resource | CPU#2, CPU#3, Memory#2, LU#2 | Operating | XXX |
| | .... | .... | .... | .... | .... |
| CPU | CPU#1 | Low-order resource | Server#1 | Operating | XXX |
| | ... | ... | ... | .... | .... |
| | CPU#4 | Tenant-environment allocated resource | Server#2 | Operating | XXX |
| | .... | .... | .... | .... | .... |
| .... | ... | ... | ... | .... | .... |
| LU | ... | ... | ... | .... | .... |
| | LU#4 | Tenant-environment allocated resource | Pool#1 | Damaged | XXX |
| | ... | ... | ... | .... | .... |
| Pool | Pool#1 | Low-order resource | PG#2 | Shared | XXX |
| | ... | ... | ... | .... | .... |
| Parity Group | PG#1 | Low-order resource | Storage#1 | Operating | XXX |
| | ... | ... | ... | .... | .... |
| Storage apparatus | Storage#1 | Low-order resource | XXX | Occupied | XXX |
| | .... | .... | .... | .... | .... |

FIG. 21

Operation authority management table
2100

| Administrator type | Resource category | Operation authority | |
|---|---|---|---|
| | | Reference | Change |
| Tenant administrator | High-order resource | Authorized | Authorized |
| | Tenant-environment allocated resource | Authorized | Authorized |
| | Low-order resource | Unauthorized | Unauthorized |
| | Unallocated resource | Unauthorized | Unauthorized |
| System administrator | High-order resource | Unauthorized | Unauthorized |
| | Tenant-environment allocated resource | Authorized | Unauthorized |
| | Low-order resource | Authorized | Authorized |
| | Unallocated resource | Authorized | Authorized |

FIG. 22

Dependence relation management table
2200

| Resource type name (2201) | Dependence destination resource type name (2202) |
|---|---|
| APP | OS |
| OS | VM |
| OS | LPAR |
| VM | CPU, Memory, LU |
| LPAR | CPU, Memory, LU |
| CPU | Server |
| Memory | Server |
| LU | Pool |
| Pool | Parity Group |
| Parity Group | Storage apparatus |

FIG. 23

Monitoring table
2300

| Time point (2301) | Monitoring result (2302) |
|---|---|
| 2015_01_01 10:00:00 | XXXXXXXXXX |
| 2015_01_01 10:00:15 | XXXXXXXXXX |
| .... | .... |

FIG. 24

Resource group management table
2400

| Resource group ID | Administrator ID | Group configuration | Operation authority detail |
|---|---|---|---|
| RG#1 | Administrator#1 | VM#1, ... | A corresponding administrator ID conforms to an operation authority management table<br>Other administrator IDs conform to the operation authority management table only for reference<br>A change is not allowed at all |
| ... | ... | ... | ... |

FIG. 25

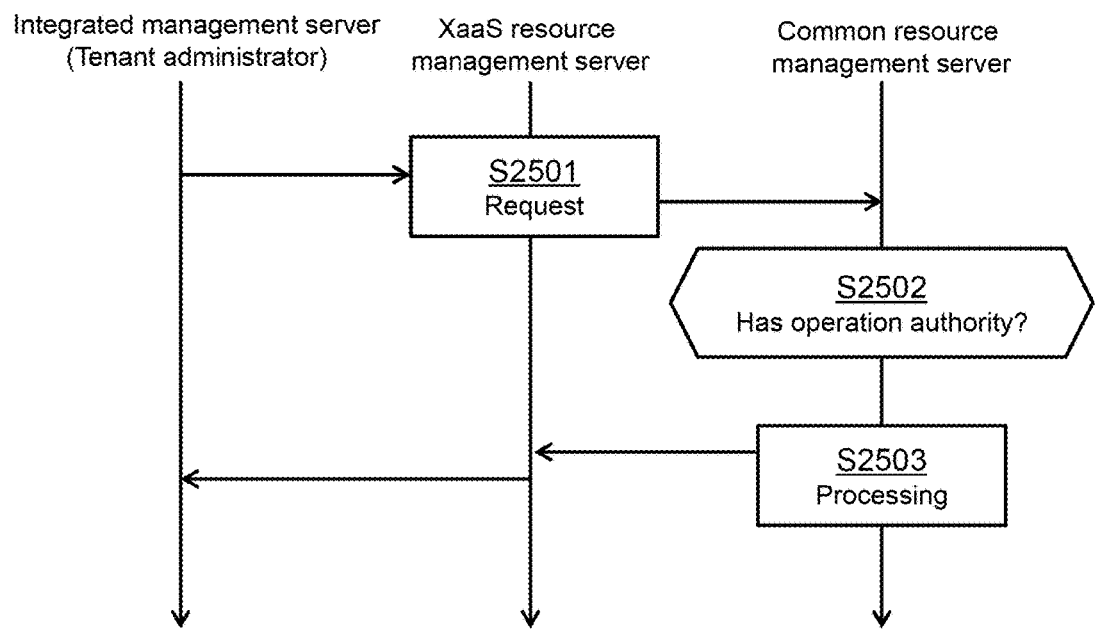

FIG. 32

Information concerning a resource corresponding to a tenant administrator #1
(Reference: including information concerning a low-order resource)
(Change: not including the information concerning the low-order resource)

FIG. 33

Information concerning a resource corresponding to a tenant administrator #1
(Not including information concerning a high-order resource)

Information concerning a resource corresponding to a tenant administrator #2
(Not including the information concerning the high-order resource)

⋮

MANAGEMENT SYSTEM FOR COMPUTER SYSTEM

TECHNICAL FIELD

The present invention generally relates to allocation control of resources included in a computer system.

BACKGROUND ART

There is Japanese Patent Laid-Open No. 2014-23142 (PTL 1) as a background art of this technical field. In this publication, there is the following description: "There is provided a cloud computing subsystem for computing resource provisioning having various service levels on a specific network separation area. Further, there is provided a protocol for controlling flows of frames from tenants in the cloud computing subsystem and to the tenants." (see the abstract).

CITATION LIST

Patent Literature

[PTL 1] Japanese Patent Laid-Open No. 2014-23142

SUMMARY OF INVENTION

Technical Problem

A word XaaS (X as a Service) is known. XaaS generally means a service that makes it possible to use, through a network such as the Internet, some resources necessary for construction or operation of an information system (e.g., hardware, lines, a software execution environment, application software, and a development environment). A character (or a word) adopted as "X" of the XaaS is different depending on a type (a service model) of the XaaS. For example, as an example of the XaaS, there is a PaaS (Platform as a Service), an SaaS (Software as a Service), an IaaS (Infrastructure as a Service), an HaaS (Hardware as a Service), and the like.

PTL 1 does not disclose operation after provisioning of a resource of a type conforming to the XaaS. Management after provisioning of resources of a plurality of types conforming to XaaSs of a plurality of types is not easy.

Specifically, for example, when there are XaaSs of a plurality of types (a plurality of service models of the XaaSs are present), types of resources provisioned as a tenant environment to tenants (tenant-environment allocated resources) are different depending on types of the XaaS. Therefore, concerning resources of a plurality of types of the same computer system, resource management that takes into account types of tenant-environment allocated resources that are different depending on the types of the XaaS has to be performed.

For example, it is also conceivable that a plurality of XaaS resource management servers that are different depending on types of the XaaSs are present with respect to one common resource management server and it is desired to lend, among a plurality of types of the XaaSs, resources of a computer system managed by the common resource management server. The "XaaS resource management server" is a management server that is present, for example, for each type of the XaaS, and at least manages a tenant-environment allocated resource conforming to a specific XaaS. The "common resource management server" is a management server that manages at least a low-order resource among the resources of the computer system. The "low-order resource" is a resource lower in order than the tenant-environment allocated resource. When one common resource management server is shared from a plurality of XaaS resource management servers, it is necessary to control requests for resources from the XaaS resource management servers taking into account the fact that types of tenant-environment allocated resources managed by the XaaS resource management servers are different.

Solution to Problem

A management system includes: an interface device coupled to a computer system including a plurality of resources, which include resources of a plurality of resource types; and a processor coupled to the interface device. The processor allocates, among the plurality of resources including the resources of the plurality of resource types, a resource of a resource type, which is different depending on a type of an XaaS (X as a Service), to a tenant environment and provides a plurality of the tenant environments including a plurality of the XaaSs. The processor manages, among the plurality of resources including the resources of the plurality of resource types, as low-order resources, resources lower in order than the resources allocated to the tenant environments. When receiving a change request for a resource, the processor executes change processing on at least one or more low-order resources among the resources managed as the low-order resources.

A management system is a management system that manages a computer system including a plurality of resources, which include resources of a plurality of resource types, the management system including: a plurality of XaaS resource management servers corresponding to XaaSs of a plurality of types; and a common resource management server. Each of the plurality of XaaS resource management servers provides a tenant environment conforming to the XaaS corresponding to the XaaS resource management server. The common resource management server allocates, among the plurality of resources including the resources of the plurality of resource types, a resource of a resource type, which is different depending on a type of the XaaS, to a tenant environment corresponding to the XaaS. The common resource management server manages, among the plurality of resources including the resources of the plurality of resource types, as low-order resources, resources lower in order than the resources allocated to the tenant environments. When receiving a change request for a resource from any one of the XaaS resource management servers, the common resource management server executes change processing on at least one or more low-order resources among the resources managed as the low-order resources concerning the tenant environment provided by the XaaS resource management server.

Advantageous Effects of Invention

It is possible to expect that highly reliable management is realized even after resources of a plurality of types conforming to XaaSs of a plurality of types are provided to a plurality of tenants.

BRIEF DESCRIPTION OF DRAWINGS

FIG. 14 shows a configuration example of a tenant management table.

FIG. 15 shows a configuration example of a tenant environment management table.

FIG. 16 shows a configuration example of a service model management table.

FIG. 17 shows a configuration example of a resource individual management table.

FIG. 18 shows a configuration example of an administrator management table.

FIG. 19 shows a configuration example of the tenant environment management table.

FIG. 20 shows a configuration example of a resource management table.

FIG. 21 shows a configuration example of an operation authority management table.

FIG. 22 shows a configuration example of a dependence relation management table.

FIG. 23 shows a configuration example of a monitoring table.

FIG. 24 shows a configuration example of a resource group management table.

FIG. 25 shows an overview of a flow of processing performed in response to a request from a tenant administrator.

FIG. 32 shows an example of information displayed to the tenant administrator.

FIG. 33 shows an example of information displayed to the system administrator.

DESCRIPTION OF EMBODIMENT

Figure 1:
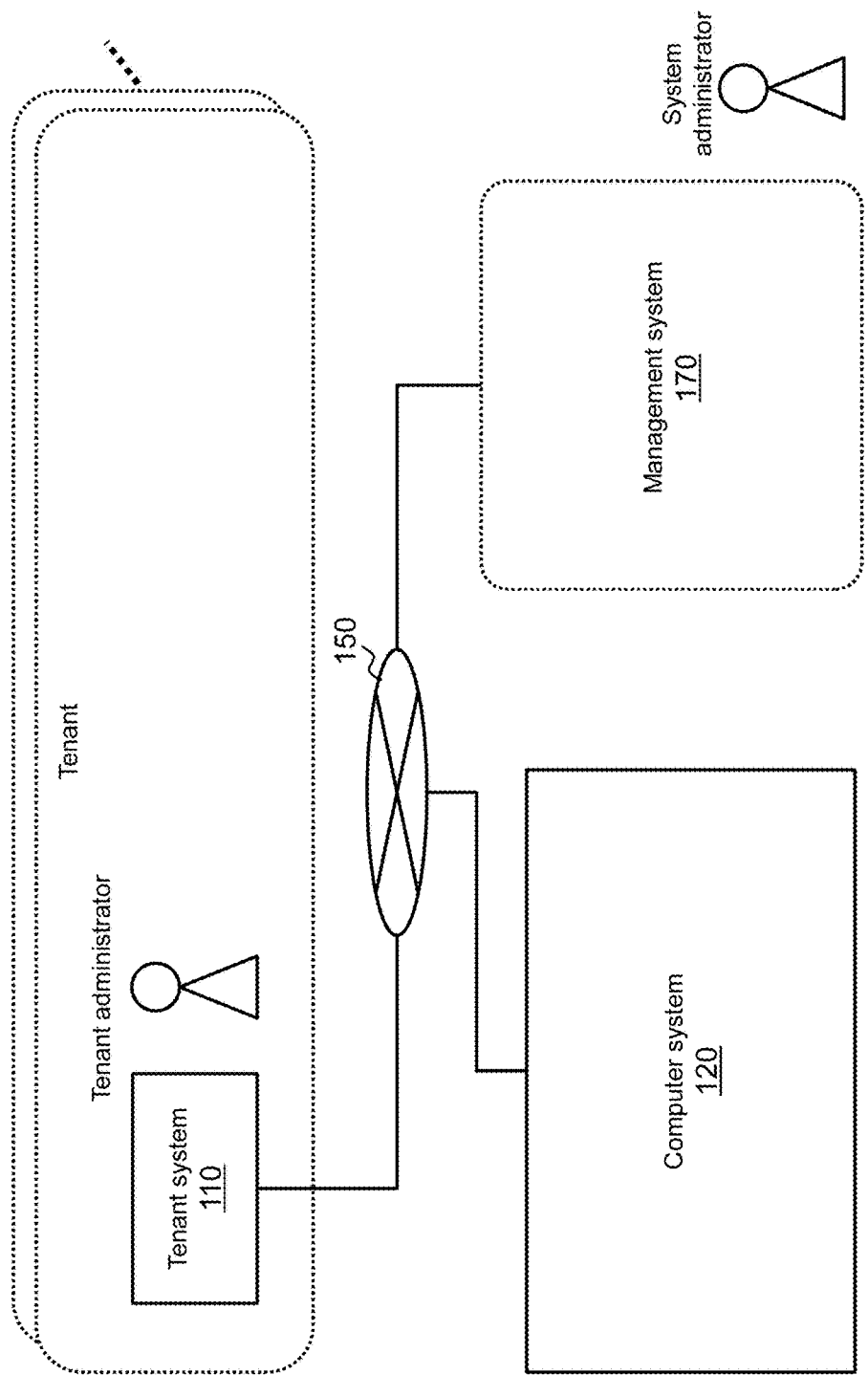
FIG. 1 shows an overview of an information system according to an embodiment.

An embodiment is explained below.

In the following explanation, information is sometimes explained using an expression "XXX table". However, the information may be represented by any data structure. That is, the "XXX table" can be referred to as "XXX information" in order to indicate that the information does not depend on a data structure. In the following explanation, the configurations of tables are examples. One table may be divided into two or more tables. All or a part of two or more tables may be one table.

In the following explanation, an ID or a name is used as identification information of an element. However, other kinds of identification information may be used instead of or in addition to the ID or the name.

In the following explanation, when elements of the same kind are explained without being distinguished, in some case, a reference sign or a common number in the reference sign is used. When the elements of the same kind are distinguished and explained, in some case, the reference sign of the element is used or an ID allocated to the element is used instead of the reference sign.

In the following explanation, an I/O (Input/Output) request is a write request or read request and may be referred to as access request.

In the following explanation, a "storing unit" may be one or more storage devices including memories. For example, of a main storage device (typically, a volatile memory) and an auxiliary storage device (typically, a nonvolatile storage device), the storing unit may be at least the main storage device.

In the following explanation, a "PDEV" indicates a physical storage device. Typically, the "PDEV" may be a nonvolatile storage device (e.g., an auxiliary storage device). The PDEV may be, for example, an HDD (Hard Disk Drive) or an SSD (Solid State Drive).

In the following explanation, a "RAID" is an abbreviation of Redundant Array of Independent (or Inexpensive) Disks. A RAID group is configured by a plurality of PDEVs and stores data according to a RAID level associated with the RAID group. The RAID group may be referred to as parity group. The parity group may be, for example, a RAID group that stores parity.

In the following explanation, processing is sometimes explained using a "program" as a subject. However, the program is executed by processor (e.g., a CPU (Central Processing Unit)) to perform decided processing while using, for example, a storing unit (e.g., a memory) and/or an interface device (e.g., a communication port) as appropriate. Therefore, the subject of the processing may be the processor. The processing explained using the program as the subject may be processing performed by a processor or an apparatus or a system including the processor. The processor may include a hardware circuit that performs a part or the entire processing. The program may be installed in an apparatus such as a computer from a program source. The program source may be, for example, a storage medium readable by a program distribution server or a computer. When the program source is the program distribution server, the program distribution server may include a processor (e.g., a CPU) and a storing unit. The storing unit may further store a distribution program and a distribution target program. The processor of the program distribution server may execute the distribution program to distribute the distribution target program to other computers. In the following explanation, two or more programs may be realized as one program or one program may be realized as two or more programs.

In the following explanation, a management system may be configured by one or more computers. Specifically, for example, when a management computer displays information (specifically, for example, the management computer displays information on a display device of the management computer or the management computer (e.g., a management server) transmits information for display to a remote computer for display (e.g., a management client)), the management computer is a management system. For example, when a function equivalent to a function of the management computer is realized by a plurality of computers, the plurality of computers (which may include the computer for display when the computer for display performs display) are the management system. The management computer (e.g., the management system) may include an interface device coupled to an I/O system including a display system, a storing unit (e.g., a memory), and a processor coupled to the interface device and the storing unit. The display system may be a display device included in the management computer or may be the computer for display coupled to the management computer. The I/O system may be an I/O device (e.g., a keyboard and a pointing device or a touch panel) included in the management computer or may be the computer for display or another computer coupled to the management computer. The management computer "displaying information for display" may be displaying the information for display on the display system. This may be displaying the information for display on the display device included in the management computer or may be the management computer transmitting the information for display to the computer for display (in the latter case, the information for display is displayed by the computer for display). The management computer inputting and outputting information may be performing input and output of information between the management computer and the I/O device included in the management computer or may be performing input and output of information between the management computer and a remote computer (e.g., the computer for display) coupled to the management computer. The output of information may be display of information.

In the following explanation, a "VOL" is an abbreviation of logical volume and may be a logical storage device. The VOL may be a real VOL (RVOL) or may be a virtual VOL (VVOL). As the VOL, there may be an online VOL provided to a host system coupled to a storage system that provides the VOL and an offline VOL not provided to the host system (not recognized from the host system). The "RVOL" may be a VOL based on a physical storing unit (e.g., one or more RAID groups) included in a storage system including the RVOL. The "VVOL" may be at least one kind of an externally coupled VOL (EVOL), a capacity expanded VOL (TPVOL), and a snapshot VOL. The EVOL may be a VOL based on a storage space (e.g., a VOL) of an external storage system and conforming to a storage virtualization technique. The TPVOL may be a VOL configured by a plurality of virtual areas (virtual storage areas) and conforming to a capacity virtualization technique (typically, Thin Provisioning). As the snapshot VOL, there may be a snapshot VOL provided as a snapshot of an original VOL. The TPVOL may be typically the online VOL. The snapshot VOL may be the RVOL. A "pool" is a logical storage area (e.g., a set of a plurality of pool VOLs) and may be prepared for each use. For example, as the pool, there may be at least one kind of a TP pool and a snapshot pool. The TP pool may be a storage area configured by a plurality of real areas (real storage areas). The real area may be allocated to a virtual area of the TPVOL from the TP pool. The snapshot pool may be a storage area in which data retracted from the original VOL is stored. One pool may be used as the TP pool or may be used as the snapshot pool. The "pool VOL" may be a VOL serving as a component of the pool. The pool VOL may be the RVOL or may be the EVOL. The pool VOL may be typically the offline VOL. The VOL may be referred to as an LU (Logical Unit).

FIG. 1 shows an overview of an information system according to an embodiment.

In the information system, a computer system 120, a tenant system 110, and a management system 170 are present.

The computer system 120 includes a plurality of resources including resources of a plurality of types. Note that, in the following explanation, a type of a resource is referred to as "resource type". The plurality of resources have a dependence relation among different resource types. The resource may be a physical resource or may be a virtual resource. As the plurality of resources, there are, for example, one or more storage apparatuses and one or more blade servers coupled to the one or more storage apparatuses. That is, in this embodiment, the computer system 120 may be a so-called integrated platform including both of the blade server and the storage apparatus. The "blade server" is an example of a server computer and may be referred to as "server computer". A specific example of the plurality of resources is explained below.

The tenant system 110 is a system configured by one or a plurality of computers and is present for each tenant. The "tenant" is an example of a user and is a user who rents (or purchases) a tenant-environment allocated resource among a plurality of resources included in the computer system 120. Specifically, for example, the "tenant" is a user of a cloud service that provides resources of the computer system. The "tenant-environment allocated resource" is a resource (an example of a provisioned resource) allocated to a tenant environment and may be referred to as "provisioning resource". The "tenant environment" is a virtual environment provided to a tenant (the tenant system 110). A resource is allocated to the environment, whereby the tenant (the tenant system 110) can use the resource (the tenant-environment allocated resource) or a high-order resource created on the basis of the resource. The tenant system 110 is coupled to the computer system 120 and the management system 170 via a communication network (e.g., an IP (Internet Protocol) network) 150. As a use of the tenant-environment allocated resource, for example, the tenant system 110 can log in to the resource. When an XaaS is an SaaS, the tenant system 110 may be, for example, a personal computer that starts a browser (e.g., a Web browser).

Figure 2:
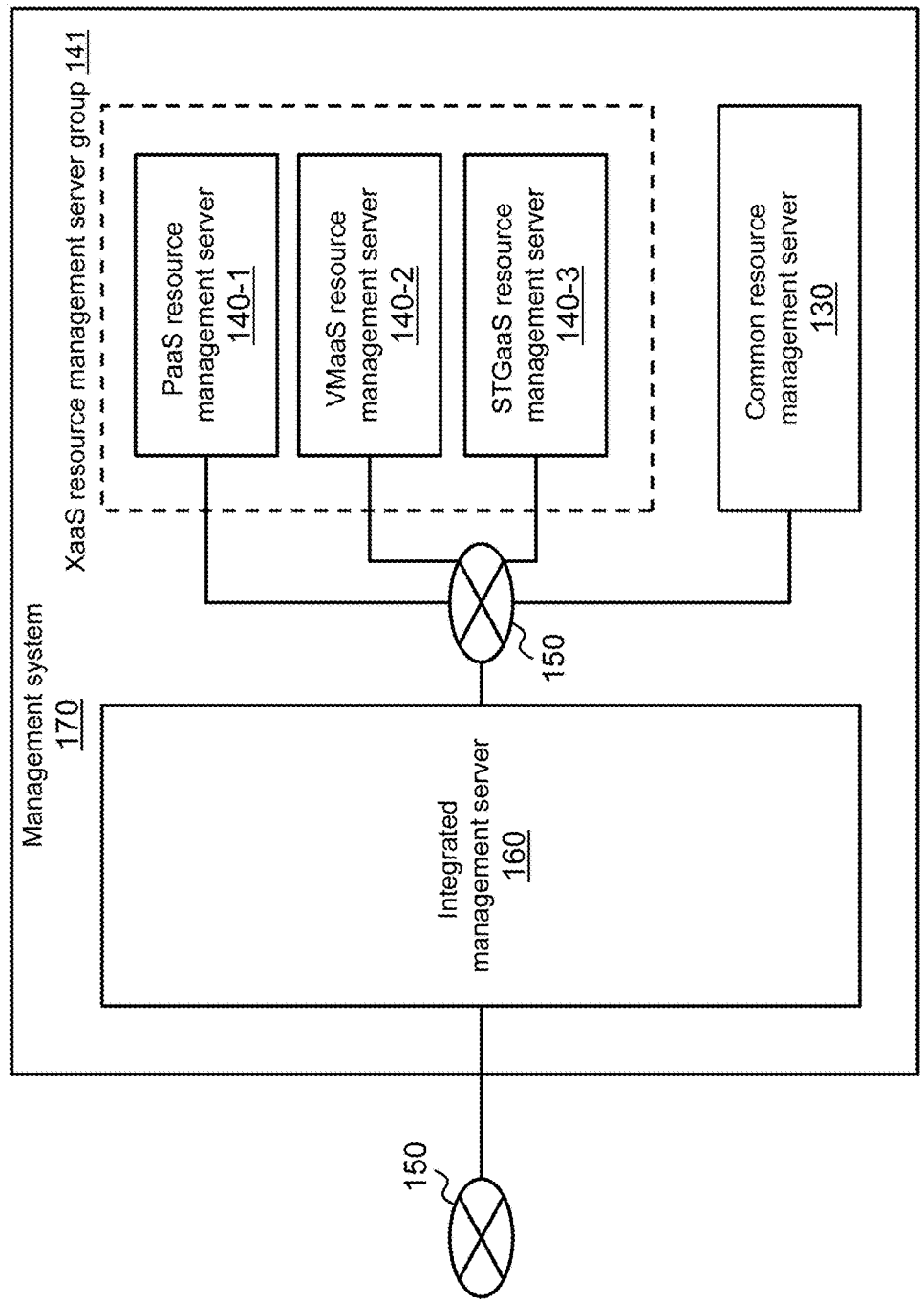
FIG. 2 shows an example of a management system.

FIG. 2 shows a configuration example of the management system 170.

The management system 170 includes an integrated management server 160, an XaaS resource management server group 141, and a common resource management server 130. The XaaS resource management server group 141 is a plurality of XaaS resource management servers 140, which are different depending on types of XaaSs, and is, for example, a PaaS resource management server 140-1 for a PaaS, a VMaaS resource management server 140-2 for a VMaaS, and an STGaaS resource management server 140-3 for an STGaaS. The XaaS resource management server 140 is a computer that is present, for example, for each type of the XaaS and manages, of a tenant-environment allocated resource conforming to a specific XaaS and a high-order resource of the tenant-environment allocated resource, at least the tenant-environment allocated resource. Note that there are resources of types necessary for a plurality of XaaS resource management servers 140 to provide tenant-environment allocated resources, for example, resources of a server, resources of a storage, or the like. The common resource management server 130 manages resources of types necessary in common in the plurality of XaaS resource management servers 140. The common resource management server 130 may also play a role of a certain kind of the XaaS resource management server 140.

The integrated management server 160 is one or more computers used by a tenant administrator or a system administrator. The "tenant administrator" is an administrator of the tenant system 110. The tenant administrator and a user of the tenant system 110 may be employees belonging to the same tenant. The tenant administrator may be an employee of a company different from the tenant. The "system administrator" may be an administrator of the computer system 120. The integrated management server 160 is coupled to the tenant system 110 and the computer system 120 via the communication network 150. The integrated management server 160 is coupled to the XaaS resource management servers 140 and the common resource management server 130 via the communication network 150. The XaaS resource management servers 140 are coupled to the common resource management server 130 via the communication network 150.

The integrated management server 160 manages types of XaaSs and the XaaS resource management servers 140 corresponding to the XaaSs in association with each other. The integrated management server 160 transmits a request (e.g., a resource allocation request) of the tenant administrator to any one of the XaaS resource management servers 140 on the basis of a requested type of an XaaS. For example, when a tenant environment of a PaaS is requested from the tenant administrator (the tenant system 110), the integrated management server 160 transmits the request of the tenant administrator to the PaaS resource management server 140-1 for the PaaS. The XaaS resource management server 140 executes processing based on the received request of the tenant administrator to allocate a resource (a tenant-environment allocated resource) to the tenant environment and provides the tenant environment to the tenant system 110. For example, when the request of the tenant administrator is a resource allocation request, the XaaS resource management server 140 requests the common resource management server 130 to allocate a resource. The XaaS resource management server 140 receives a response to the request (e.g., a response indicating that a resource is allocated to the tenant environment) from the common resource management server 130. The XaaS resource management server 140 transmits a response to the request of the tenant administrator to the integrated management server 160. The integrated management server 160 transmits, on the basis of the response, information necessary for use of the resource (e.g., information necessary for login) to the tenant system 110 (the tenant administrator). The tenant system 110 can use, on the basis of the information, the tenant-environment allocated resource (or a high-order resource of the tenant-environment allocated resource) of the computer system 120.

The integrated management server 160 transmits the request of the system administrator to the common resource management server 130 or the XaaS resource management server 140. The integrated management server 160 responds to the system administrator (a management computer of the system administrator) on the basis of a response from the common resource management server 130 or the XaaS resource management server 140. Processing executed by the common resource management server 130 and the XaaS resource management server 140 may be executed by the integrated management server 160.

Figure 3:
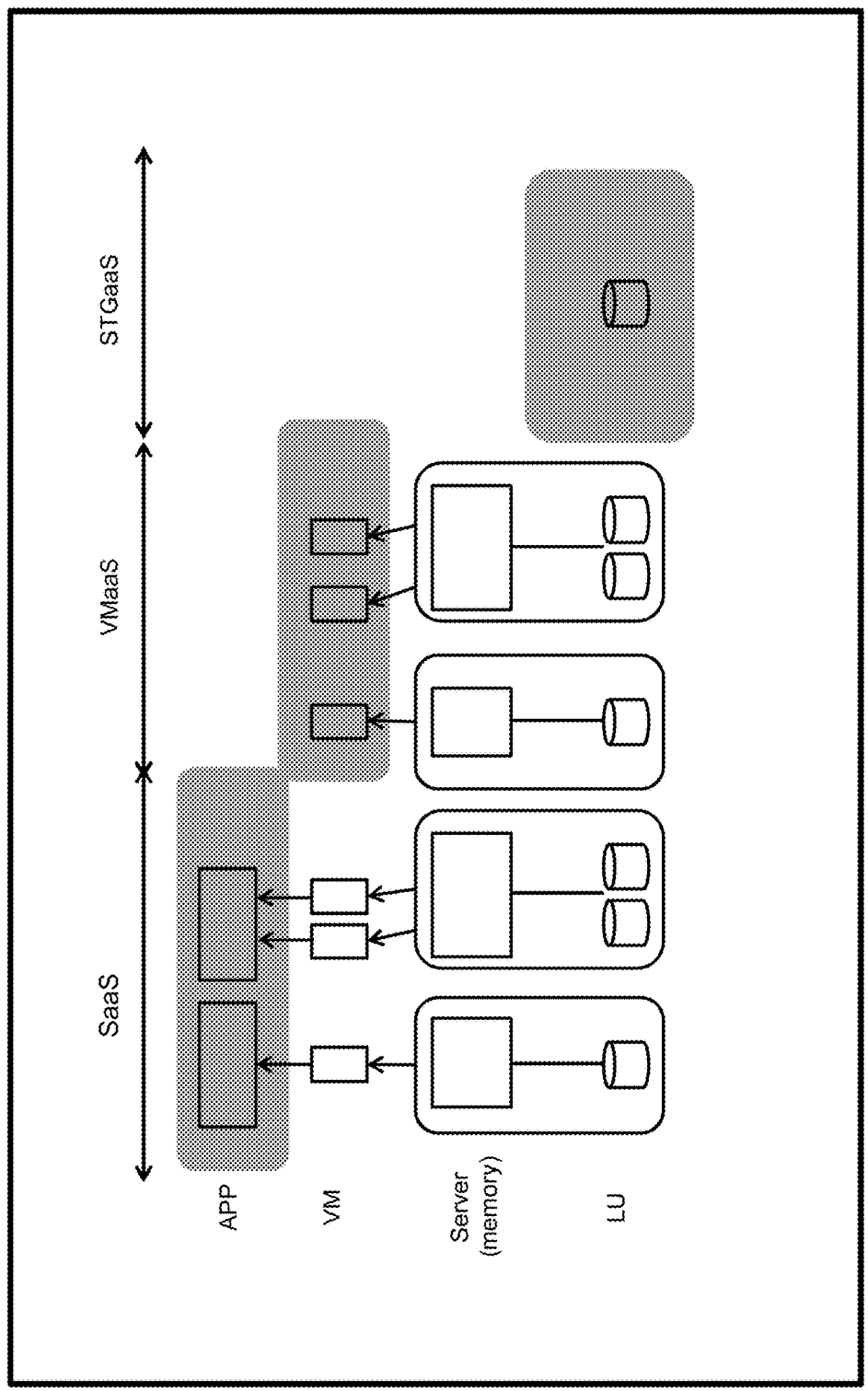
FIG. 3 shows an overview of a computer system.

FIG. 3 shows an overview of the computer system 120.

The computer system 120 provides XaaSs of a plurality of types as explained above. A type of an XaaS is different depending on a word used as "X", in other words, a type of a resource set as a tenant-environment allocated resource. For example, in this embodiment, there are a PaaS (Platform as a Service), a VMaaS (VM as a Service), an STGaaS (Storage as a Service), and the like. In FIG. 3, tenant-environment allocated resources are highlighted (displayed in gray). However, as it is seen from FIG. 3, a type of the tenant-environment allocated resource (a tier to which the tenant-environment allocated resource belongs) is different depending on an XaaS type. The tenant-environment allocated resource is provided on the basis of a resource lower in order than the tenant-environment allocated resource (low-order resource). For example, a VM (Virtual Machine) is provided on the basis of a memory and an LU of a server. An APP (application program) is executed in the VM. Note that the memory of the server is an example of a resource of the server. The LU is an example of a resource of a storage. Although not shown in the figure, an LPARaaS (LPAR as a Service) may be present as a type of the XaaS.

The plurality of resources included in the computer system 120 has a dependence relation. In the following explanation, in order to represent a logical position (e.g., tier) of a resource, for convenience, words "high order/low order" and "dependence source/dependence destination" (or "parent/child") are sometimes used. For example, "a second resource higher in order than a first resource" means that the second resource relates to the first resource in terms of topology and the second resource belongs to a tier (a type) of one or more tiers higher than a tier (a type) to which the first resource belongs. "A second resource that is a dependence source (or a parent) of a first resource" means that the second resource is a resource present immediately higher in order than the first resource. That is, in the explanation of this embodiment, the "dependence source" (or the "parent") is a concept included in the "high order".

On the other hand "a second resource lower in order than a first resource" means that the second resource relates to the first resource in terms of topology and the second resource belongs to a tier (a type) of one or more tiers lower than a tier (a type) to which the first resource belongs. "A second resource that is a dependence destination (or a child) of a first resource" means that the second resource is a resource present immediately lower in order than the first resource. That is, in the explanation of this embodiment, the "dependence destination" (or the "child") is a concept included in the "low order". As an example of tiers, in an idea similar to an OSI (Open Systems Interconnection) reference model, it is conceivable that a physical resource is located in a lower-order tier and a resource closer to an APP is located in a higher-order tier. Note that the resource of the server and the resource of the storage can be treated as tiers in the same order in terms of the fact that the resources are physical resources. However, taking into account the fact that the resource of the server is always necessary for execution of the APP, the resource of the server may be present in a tier higher in order than the resource of the storage.

Taking the above into account, in this embodiment, the following terms are used.

Tenant-environment allocated resource: A resource allocated to a tenant environment.

High-order resource: A resource higher in order than the tenant-environment allocated resource.

Low-order resource: A resource lower in order than the tenant-environment allocated resource.

Unallocated resource: An unallocated resource is a resource managed by the system administrator and is a resource that is not a dependence destination of the high-order resource, the tenant-environment allocated resource, and the low-order resource. The unallocated resource could be the low-order resource or the tenant-environment allocated resource depending on a system administrator.

In this embodiment, resource management of resources of the computer system 120 is performed on the basis of a category corresponding to the resources among categories of the "high-order resource", the "tenant-environment allocated resource", the "low-order resource", and the "unallocated resource". In the following explanation, the category is referred to as "resource category" or "resource class".

As the resource management by the system administrator, for example, there are the following:

Resource creation: On the basis of a resource managed by the system administrator, create a resource higher in order than the resource.

Resource erasing: Delete a resource. Release a dependence relation between a deletion target resource and a dependence destination resource of the deletion target resource. As an extension of the resource erasing, when a certain resource does not have a dependence relation with other resources, the resource may be treated as an unallocated resource.

Attribute change: Change attributes of a resource. Note that, as an example of the attributes, attributes of a VM (Virtual Machine) are, for example, a memory capacity, the number of CPUs, the number of virtual NICs (Network Interface Controllers/Cards), a virtual PDEV (a capacity or a number), a VM identifier, and login information (e.g., an IP address at the time of login).

Dependence relation change: change a dependence relation of a resource. The dependence relation change is, for example, migration of a VM.

Resource monitoring: Monitor a resource. For example, monitor a metric value (e.g., a measurement value) of the resource, a state of the resource, and attributes of the resource.

The system administrator is not always allowed to perform the resource management on all of the resources of the computer system 120 shown in FIG. 3. For example, it is undesirable that a change in a tenant-environment allocated resource or a high-order resource is seen from the tenant administrator (or the tenant) before or after the resource management. The change is, for example, a dependence relation change or an attribute change. Some tenant administrator does not want information concerning a high-order resource to be seen from the system administrator.

Figure 6:
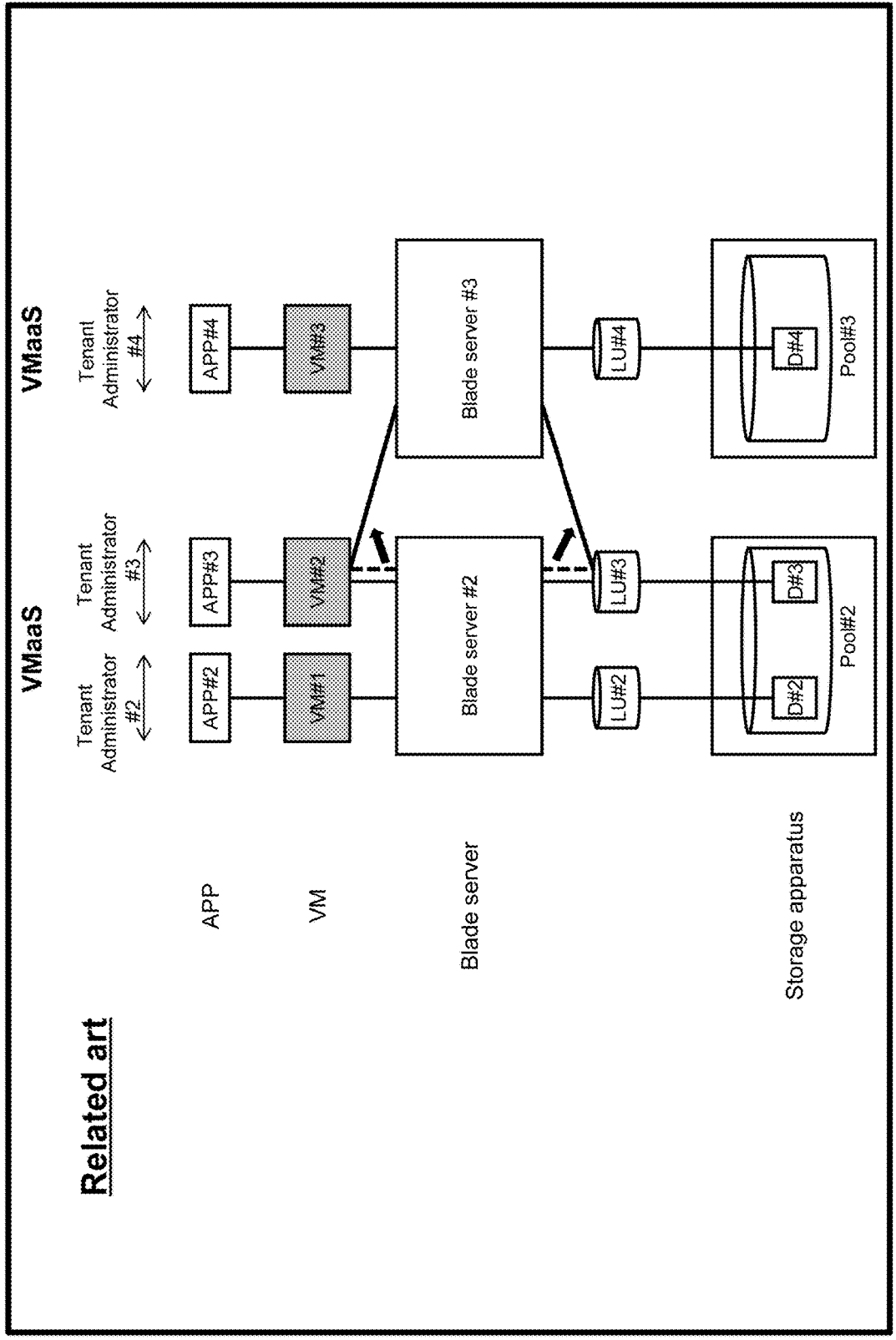
FIG. 6 shows a comparative example of a resource management method.

FIG. 6 is an example of a resource management method for solving the problems described above. Specifically, a comparative example of a resource management method in the case in which only a tenant environment of the same XaaS type is provided in a computer system is shown. In FIG. 6, tenant-environment allocated resources are highlighted (displayed in gray).

In the comparative example shown in FIG. 6, only when only a tenant environment of the same XaaS type is provided in the computer system, a resource lending between low-order resources of tenant-environment allocated resources is possible. The same XaaS type of tenant environments means that types of tenant-environment allocated resources of tenant environments are the same. As a specific example, when an XaaS type is a VMaaS, it is assumed that a tenant administrator #3 manages a VM #2 (and an APP #3 executed by the VM #2) and a tenant administrator #4 manages a VM #3 (and an APP #4 executed by the VM #3). The VM #2 and the VM #3 are respectively tenant-environment allocated resources. As low-order resources of the VM #2, a blade server #2, an LU #3, and the like are present. The VM #2 recognizes the LU #3 and accesses the LU #3. In such a configuration, the management system can change a blade server executed by the VM #2 from the blade server #2 to a blade server #3, which is a low-order resource of the VM #3 managed by another tenant administrator #4. In this case, for both of the tenant administrators #3 and #4, amounts, performance, or the like of tenant-environment allocated resources of high-order resources of the tenant-environment allocated resources are not seen as being changed. In this way, when only the tenant environment of the same XaaS type is provided in the computer system, it is possible to change a dependence relation between the tenant-environment allocated resource and the low-order resource of the tenant-environment allocated resource.

However, in the scheme explained above, a type of an XaaS provided in the computer system is limited to one. When the computer system is applied to a plurality of XaaSs, since types of tenant-environment allocated resources are different among types of the XaaSs, a computer system and a management system are necessary for each of the types of the XaaSs.

On the other hand, in this embodiment, tenant-environment allocated resources of a plurality of types corresponding to XaaSs of a plurality of types are present in the computer system 120. Tenant environments of the plurality of XaaS types are provided in the computer system 120. The management system 170 enables appropriate resource management for resources of the computer system 120.

Figure 7:
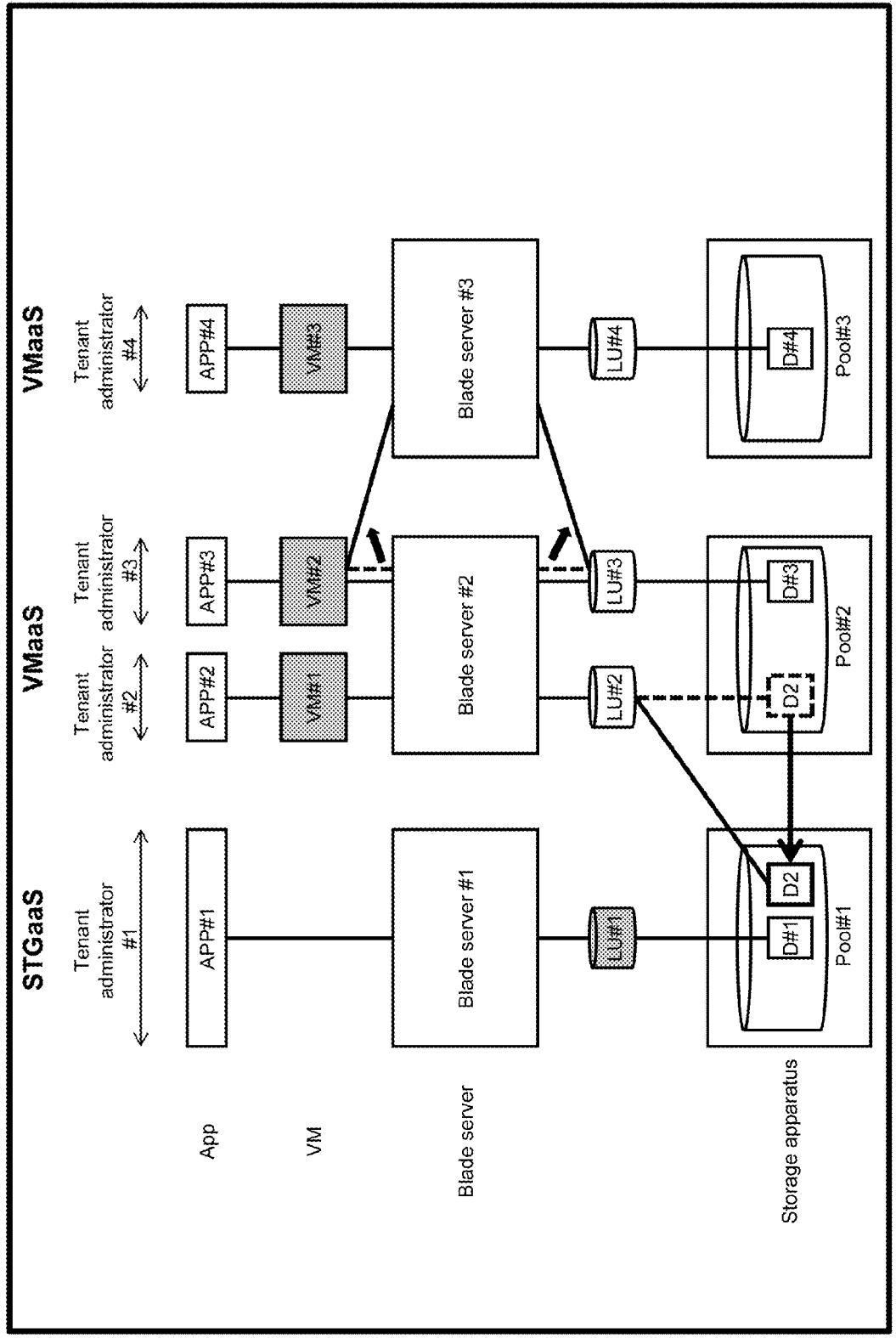
FIG. 7 shows an example of a resource management method according to the embodiment.

FIG. 7 shows an example of a resource management method according to the embodiment. In FIG. 7, tenant-environment allocated resources are highlighted (displayed in gray).

As shown in FIG. 7, when an XaaS type is different, a type of a tenant-environment allocated resource is also different. Therefore, if resource management (e.g., a dependence relation change of a resource) is performed without taking into account a difference in the type of the tenant-environment allocated resource, a deficiency that the tenant administrator can recognize (e.g., amounts or performance of the tenant-environment allocated resource decreases or amounts or performance of a high-order resource decreases) could occur. For example, even if, for a tenant environment of a certain XaaS type, the resource management is a change of a low-order resource that does not change the performance or the amounts of the tenant-environment allocated resource, a resource at a change destination of the low-order resource is likely to be a tenant-environment allocated resource or a high-order resource for a tenant environment of another XaaS type. Therefore, a deficiency that the tenant administrator can recognize could occur. This is a problem that occurs when XaaSs of a plurality of types corresponding to a plurality of tenant administrators share one computer system 120.

Therefore, in this embodiment, when the management system 170 (e.g., the common resource management server 130) allocates a resource to a tenant environment for each of a plurality of tenant administrators (tenants), the management system 170 manages at least one of (e.g., both of) a tenant-environment allocated resource and a low-order resource of the tenant-environment allocated resource. When the management system 170 detects an event concerning the tenant, the management system 170 executes resource management based on a resource category of a resource operated in processing conforming to the event.

The "detection of an event concerning the tenant" may indicate that any resource corresponding to the tenant is overloaded (e.g., a metric value concerning the resource exceeds a threshold) or may indicate that a request is received from the system administrator concerning any resource corresponding to the tenant. The request may be a request for allocation of a resource that satisfies a requirement desired by the tenant administrator or may be a request for a change of a type of an XaaS.

The management system 170 (e.g., the common resource management server 130) does not perform, concerning a dependence relation between one or more tenant-environment allocated resources and one or more dependence destination resources of the tenant-environment allocated resources, a change of a tenant-environment allocated resources and a change in which performance or amounts concerning the dependence destination resource change. This is because such a dependence relation change is seen from the tenant administrator (or the tenant). For example, when a change occurs in the performance or the amounts of the tenant-environment allocated resource according to a change in the performance or the amounts of the dependence destination resource, the change can be recognized by the tenant administrator (or the tenant). As an example, the number of dependence destination resources decreases and, as a result, amounts (e.g., memory capacities) of the dependence destination resources decrease.

On the other hand, the management system 170 (e.g., the common resource management server 130) may execute a change in which, before and after a change of a dependence relation between one or more tenant-environment allocated resources and one or more dependence destination resources of the tenant-environment allocated resources, performance or amounts of the dependence destination resources are the same (does not change). This is because, if the performance or the amounts of the dependence destination resources do not change, there is no change in performance or amounts of tenant-environment allocated resources recognized by the tenant administrator (or the tenant). For example, a change in which the number of dependence destination resources changes but amounts (e.g., memory capacities) of the dependence destination resources do not change is permitted.

The change in the performance or the amounts of the tenant-environment allocated resources is, for example, as explained below. When an XaaS type is a VMaaS, the change in the performance or the amounts of the tenant-environment allocated resource may be a change in at least one of attributes (e.g., a memory capacity, the number of CPUs, the number of virtual NICs (Network Interface Controllers/Cards), a virtual PDEV (a capacity or a number), a VM identifier, and login information (e.g., an IP address at the time of login)) of resources of a VM (Virtual Machine). When the XaaS type is a PaaS, the change in the performance or the amounts of the tenant-environment allocated resources may be a change in a memory capacity. When the XaaS type is an LPARaaS, the change in the performance or the amounts of the tenant-environment allocated resource may be the same as the change in the case in which the XaaS type is the VMaaS or may be a change in a memory. When the XaaS type is an STGaaS, the change in the performance or the amounts of the tenant-environment allocated resource may be at least one of attributes (e.g., an LUN (Logical Unit Number), a port number, a VOL identifier, a VOL capacity, and a pool configuration (e.g., a ratio of a tier) of a resource of a storage apparatus.

As an example of resource management to be executed, there is control shown in FIG. 7. That is, the management system 170 (e.g., the common resource management server 130) performs resource lending between low-order resources of different XaaS types. Specifically, for example, it is assumed that an LU #1 is provided to a tenant administrator #1 as a tenant-environment allocated resource of an STGaaS and a pool #1 is a low-order resource. It is assumed that a VM #1 is provided to a tenant administrator #2 as a tenant-environment allocated resource of a VMaaS and a pool #2 is a low-order resource. The management system 170 can grasp a state of a resource by repeatedly (e.g., periodically) receiving information including a metric value (e.g., a measurement value) of the resource from the computer system 120. It is assumed that the received information is registered in management information retained by the management system 170. It is assumed that the management information includes information representing a dependence relation (e.g., a topology relation) among a plurality of resources and information respectively representing a tenant-environment allocated resource and a low-order resource concerning each of a plurality of tenant administrators (tenants).

For example, it is assumed that, when detecting an overload of the pool #2, the management system 170 determines to move data #2 (D#2) in the pool #2 to another pool (change a pool associated with the LU #2 (a VOL conforming to Thin Provisioning) to another pool) in order to eliminate the overload of the pool #2. It is assumed that the management system 170 detects on the basis of the management information that there are pools #1 and #3 as moving destination candidates of the data #2 and a load of the pool #1 is the lowest. The management system 170 detects on the basis of the management information that both of the pool #1 and the pool #2 correspond to a resource category of a low-order resource. A change of a pool, which is a low-order resource, is not seen from the tenant administrator. Therefore, the management system 170 moves data #2 (D#2) from the pool #2 to the pool #1 and associates the LU #2 with the pool #1 instead of the pool #2.

In this way, the management system 170 (e.g., the common resource management server 130) can execute resource management in which a deficiency that the tenant administrator can recognize does not occur. Even when an XaaS type is different among tenant environments and a type of a tenant-environment allocated resource is different, since the management system 170 of this embodiment manages the resources of the computer system in association with the resource categories, it is possible to lend resources among resources of the same type, a resource category of which is a low-order resource.

This embodiment is explained in detail below. Note that, as illustrated in FIG. 7, resources of a plurality of resource types included in the computer system 120 have a dependence relation, for example, a hierarchical topology configuration (a route may be absent) among different resource types. The resources may be a virtual resource or may be a physical resource as explained above. For example, as the resources, an APP (Application Program), an OS (Operating System), a VM, a VM element (e.g., a virtual memory and a virtual CPU), an LPAR (Logical Partitioning), a blade server, blade server elements (e.g., a physical memory and a physical CPU), a storage apparatus, and storage apparatus elements (e.g., an LU (a VOL), a pool, a PDEV, and a PG (Parity Group)) can be adopted. A concept of "high order/low order" could be different depending on what the management system 170 is to manage (e.g., monitor). In the management system 170, the "high order/low order" may be defined according to a predetermined standard. For example, when the resources are in a "coupling relation", one resource may be a low-order resource and the other resource depending on the one resource (based on one resource) may be a high-order resource. When the resources are in an "inclusion relation", one resource may be a low-order resource and the other resource including the one resource may be a high-order resource.

Figure 8:
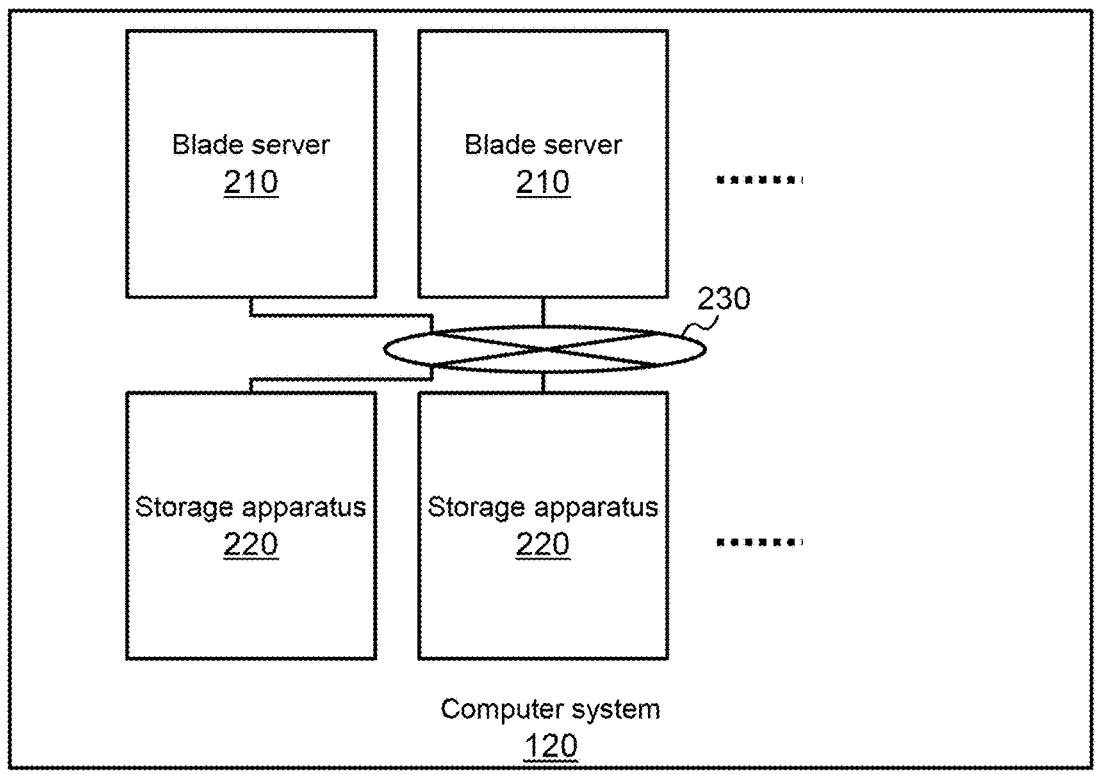
FIG. 8 shows a configuration example of the computer system.

FIG. 8 shows a configuration example of a computer system 120.

The computer system 120 includes a plurality of (or one) storage apparatuses 220 and a plurality of (or one) blade servers 210 coupled to the plurality of storage apparatuses 220 via a SAN (Storage Area Network) 230. The blade server 210 is an example of a server apparatus. A communication medium of another kind such as a PCIe bus may be adopted instead of the SAN 230.

Figure 9:
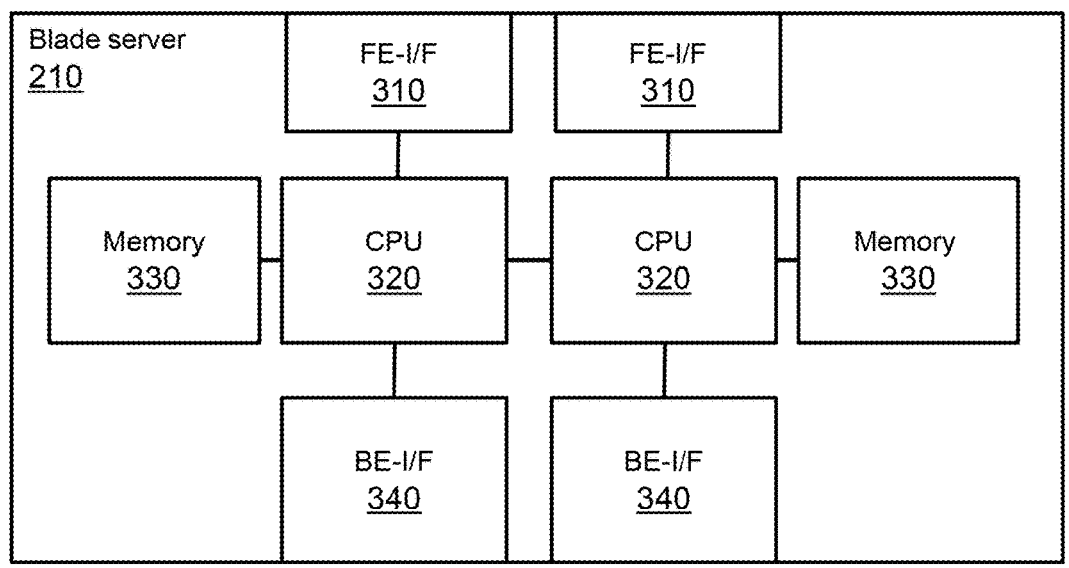
FIG. 9 shows a configuration example of a blade server.

FIG. 9 shows a configuration example of the blade server 210.

The blade server 210 includes an FE-I/F (Frontend Interface Device) 310 coupled to the tenant system 110 and the management system 170 (at least one of the integrated management server 160, the XaaS resource management server 140, and the common resource management server 130), a BE-I/F (Backend Interface Device) 340 coupled to the storage apparatus 220, a memory 330, and a CPU 320 coupled to the FE-I/F 310, the BE-I/F 340 and a memory 330. It is possible to execute or provide an LPAR, a VM, and an APP on the basis of the blade server 210.

Figure 10:
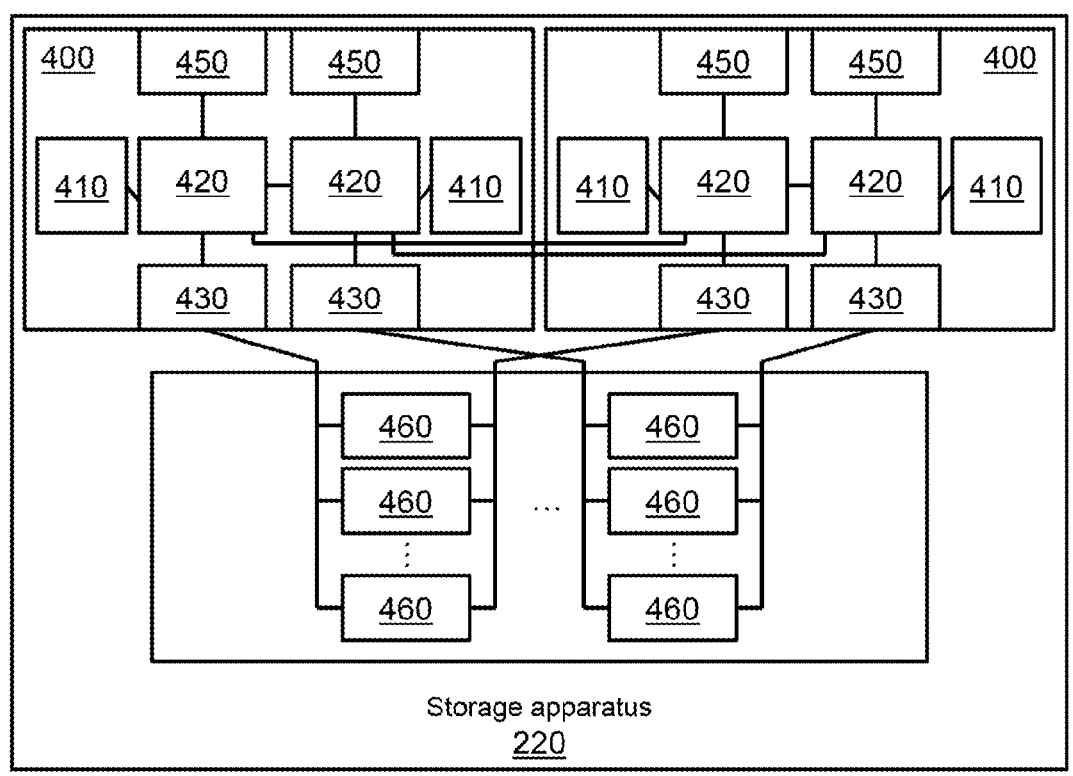
FIG. 10 shows a configuration example of a storage apparatus.

FIG. 10 shows a configuration example of the storage apparatus 220.

The storage apparatus 220 includes duplex storage controllers 400 and a plurality of PDEVs 460 coupled to the respective storage controllers 400. A plurality of PGs are configured by the plurality of PDEVs 460. The storage controller 400 includes an FE-I/F 450 coupled to the blade server 210 and the management system 170 (at least one of the integrated management server 160, the XaaS resource management server 140, and the common resource management server 130), a BE-I/F 430 coupled to the PDEV 460, a memory 410, and a CPU 420 coupled to the FE-I/F 450, the BE-I/F 430, and the memory 410. The storage controller 400 provides an LU to the blade server 210, manages a relation between an LU and a pool, manages the configuration of a PG, and manages a relation between the PG and the pool.

Figure 11:
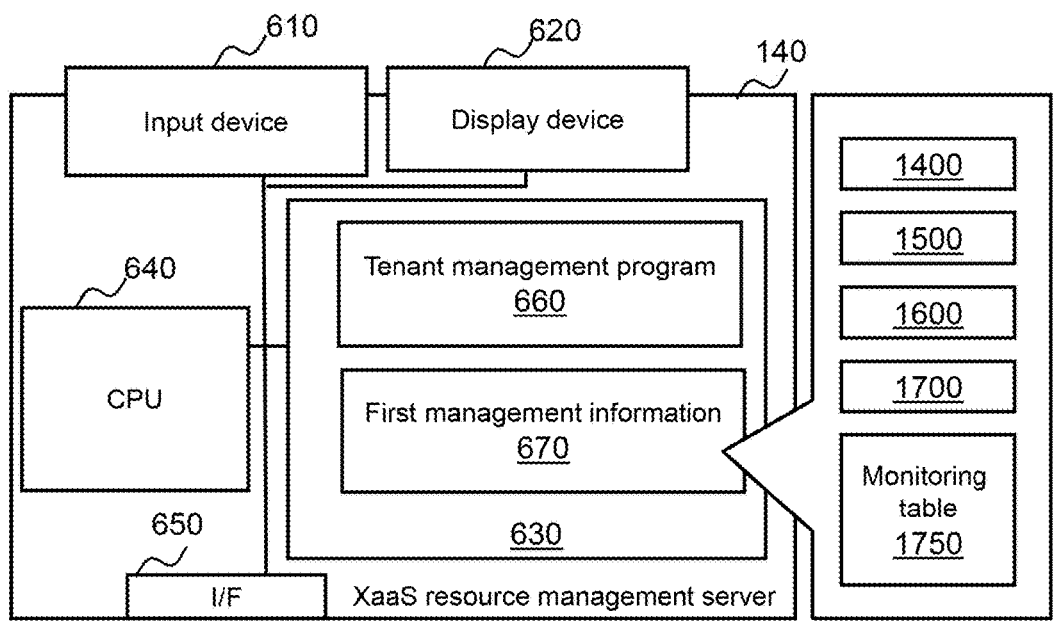
FIG. 11 shows a configuration example of an XaaS resource management server.

FIG. 11 shows a configuration example of an XaaS resource management server 140.

The XaaS resource management server 140 includes an input device (e.g., a keyboard and a pointing device) 610, a display device 620, an I/F (an interface device) 650 coupled to the integrated management server 160 and the common resource management server 130 (and the computer system 120), a storing unit (e.g., a memory) 630 that stores a computer program and information, and a CPU 640 coupled to the input device 610, the display device 620, the I/F 650, and the storing unit 630. The input device 610 and the display device 620 may be integral like a touch panel. The XaaS resource management server 140 may be coupled to a computer for display (e.g., a personal computer operated by the tenant administrator) including an input device and a display device instead of the input device 610 and the display device 620. The computer program stored by the storing unit 630 is, for example, a tenant management program 660. The tenant management program 660 is executed by the CPU 640. The information stored by the storing unit 630 is, for example, first management information 670. The first management information 670 includes a tenant management table 1400, a tenant environment management table 1500, a service model management table 1600, a resource individual management table 1700, and a monitoring table 1750. The tenant management program 660 monitors each of a plurality of resources (e.g., a high-order resource and a tenant-environment allocated resource) recognized by the XaaS resource management server 140 and registers a time point and a monitoring result (e.g., a metric value and a resource state (e.g., operating or damaged)) in the monitoring table 1750.

Note that, as processing performed by the tenant management program 660, for example, at least one of the following may be adopted.

The tenant management program 660 requests, on the basis of a request from the integrated management server 160, the common resource management server 130 to allocate a resource to a tenant environment (provisioning of the resource allocated to the tenant environment). The tenant management program 660 manages, as a tenant-environment allocated resource, a resource provisioned in response to the request.

The tenant management program 660 displays resource information corresponding to the tenant administrator. The resource information may be displayed on the basis of the first management information 670 included in the XaaS resource management server 140 or may be displayed on the basis of information from the common resource management server 130. The tenant management program 660 does not have to include a low-order resource in at least resource information displayed in response to a resource allocation request (e.g., a change request).

The tenant management program 660 performs processing for changing a dependence relation between one or more high-order resources and one or more tenant-environment allocated resources. However, in the processing, for example, when a plurality of clients (clients of the XaaS resource management server 140) who use different high-order resources are present, the tenant management program 660 does not change a dependence destination (a migration destination) of a high-order resource of a first client to a tenant-environment allocated resource or a high-order resource of a second client. For example, the tenant management program 660 prevents a plurality of resources of the same type (in the same tier) from being associated with a higher-order resource of an occupied resource.

Figure 12:
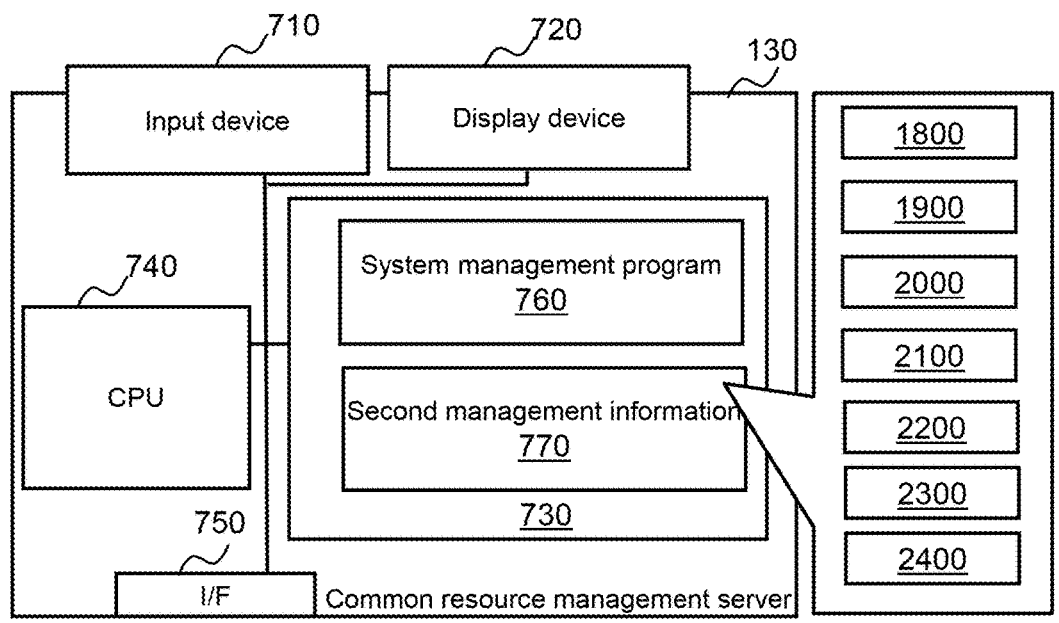
FIG. 12 shows a configuration example of a common resource management server.

FIG. 12 is a configuration example of the common resource management server 130.

The common resource management server 130 includes an input device (e.g., a keyboard and a pointing device) 710, a display device 720, an I/F (an interface device) 750 coupled to the XaaS resource management server 140 and the computer system 120, a storing unit 730 (e.g., a memory) that stores a computer program and information, and a CPU (a processor) 740 coupled to the input device 710, a display device 720, the I/F 750, and the storing unit 730. The input device 710 and the display device 720 may be integral like a touch panel. The common resource management server 130 may be coupled to a computer for display (e.g., a personal computer operated by the system administrator) including an input device and a display device instead of the input device 710 and the display device 720. The computer program stored by the storing unit 730 is, for example, a system management program 760. The system management program 760 is executed by the CPU 740. The information stored by the storing unit 730 is, for example, second management information 770. The second management information 770 includes an administrator management table 1800, a tenant environment management table 1900, a resource management table 2000, an operation authority management table 2100, a dependence relation management table 2200, a monitoring table 2300, and a resource group management table 2400. The system management program 760 monitors each of a plurality of resources (e.g., of a high-order resource, a tenant-environment allocated resource, a low-order resource, and an unallocated resource, at least the low-order resource) recognized by the common resource management server 130 and registers a monitoring result (e.g., a metric value and a resource state (e.g., operating and damaged)) in the monitoring table 2300.

Note that, as processing performed by the system management program 760, for example, at least one of the following may be adopted.

The system management program 760 includes, in a resource group corresponding to a request source tenant administrator, a resource found in response to a request (e.g., a resource allocation request) from the integrated management server 160 or the XaaS resource management server 140.

When receiving a request (e.g., a resource change request), if a resource (e.g., a tenant-environment allocated resource) operated in processing conforming to the request is a resource in a resource group corresponding to a tenant administrator at a request source, the system management program 760 performs the processing conforming to the request. On the other hand, if the resource (e.g., the tenant-environment allocated resource) operated in the processing conforming to the request is a resource outside a resource group corresponding to the tenant administrator at the request source or the XaaS resource management server 140 at the request source, the system management program 760 rejects the processing conforming to the request. Such control is performed, for example, on the basis of the resource group management table 2400. Note that the system management program 760 could receive a request from a computer other than the integrated management server 160 and the XaaS resource management server 140. The request is, for example, a snapshot creation request of a backup system (because it is desired to take a Snapshot in cooperation with a quiescence time point of an application). In order to cope with such a request, the resource group management table 2400 (and an operation authority table) like an access control list may be prepared beforehand. For example, when a resource is allocated to the tenant administrator, an ID of the allocated resource may be associated with an ID of the tenant administrator (may be registered in the resource group management table 2400).

The system management program 760 does not operate a dependence destination resource (typically, all dependence destination resources) of one or more tenant-environment allocated resources corresponding to a first tenant administrator (a first tenant) in response to a request from a second tenant administrator (or a second tenant), who is a tenant administrator (or a tenant) different from the first tenant administrator (or the first tenant). Specifically, for example, the system management program 760 does not include the dependence destination resources (typically all of the dependence destination resources) of the one or more tenant-environment allocated resources corresponding to the first tenant administrator (the first tenant) in candidates of target resources operated in response to the request from the second tenant administrator (the second tenant). Consequently, it is possible to prevent information (at least information concerning the dependence destination resources) corresponding to the first tenant administrator (the first tenant) from being provided to the second tenant administrator (the second tenant). As an example, a PaaS and a VMaaS are explained. When an APP (a PaaS resource) is provided to the first tenant administrator (the first tenant) as a tenant-environment allocated resource and a dependence destination resource is a VM (or a server), if a relation between the OS (the PaaS resource) and the VM (the dependence destination resource) is not changed and a VM, which is the dependence destination resource of the OS (the PaaS resource), is provided to the second tenant administrator (the second tenant) as a tenant-environment allocated resource (a VMaaS resource) or the like, the OS (the PaaS resource) is the tenant-environment allocated resource on one hand and is a high-order resource on the other hand. This could lead to a result that the OS (the PaaS resource) itself does not operate. the OS (the PaaS resource) could operate even if one VM is removed when two VMs are present as dependence destination resources of the OS (the PaaS resource). Therefore, there seems to be no problem at a glance. However, from a viewpoint of preventing information leakage, if the VM, which is the dependence destination resource, is directly provided to the second tenant administrator (the second tenant), data being calculated concerning the APP of the first tenant administrator (the first tenant) could be seen from the second tenant administrator (the second tenant). As explained above, the system management program 760 does not operate the dependence destination resources of the one or more tenant-environment allocated resources corresponding to the first tenant administrator (the first tenant) in response to a request from the second tenant administrator (or the second tenant). Therefore, it is possible to avoid such a problem.

The system management program 760 displays, for each tenant administrator (each tenant), information (e.g., a list of summaries) concerning resources provided to the tenant administrator. The displayed resource information may include information concerning a low-order resource and is, for example, the number of provided resources and amounts (e.g., storage capacities, the numbers of servers, the numbers of CPUs, or memory capacities) of the provided resources. The tenant administrator can learn how resources are managed (allocated) from the viewpoint of the system administrator.

The system management program 760 displays an ID of a tenant administrator corresponding to a damaged resource (a resource corresponding to a state "damaged") (or an ID of a resource group including the damaged resource), notifies the XaaS resource management server 140 that the damaged resource is present (e.g., when a certain PG (Parity Group) is degenerated, notifies the XaaS resource management server 140 corresponding to the degenerated PG that the PG is degenerated).

The system management program 760 allocates a resource (a tenant-environment allocated resource) to a tenant environment.

The system management program 760 performs processing for changing a dependence relation between one or more tenant-environment allocated resources and one or more low-order resources. In the processing, for example, the system management program 760 does not change a dependence destination (a migration destination) of a tenant-environment allocated resource of the first tenant administrator to a tenant-environment allocated resource or a high-order resource of the second tenant administrator. For example, even if the system management program 760 changes one or more resources at dependence destinations of the tenant-environment allocated resource, the system management program 760 prevents amounts or performance of the one or more resources from changing. For example, the system management program 760 prevents a plurality of resources of the same type (the same tier) from being associated with a higher-order resource of an occupied resource.

In at least one of a case in which resources of the computer system 120 run short, a case in which a use rate of the resources of the computer system 120 exceeds a predetermined threshold, and a case in which a ratio or a capacity of unallocated resources of the computer system 120 is smaller than a predetermined threshold, the system management program 760 notifies the system administrator (a computer of the system administrator) to that effect.

When the system management program 760 does not provide a resource in response to a request to allocate a resource to a tenant environment (a resource provisioning request) like the case in which resources of the computer system 120 run short, the system management program 760 notifies the XaaS resource management server 140 to that effect.

When receiving a request from the tenant administrator or the system administrator, the system management program 760 refers to the operation authority management table 2100 and executes processing conforming to the request and operation authority.

Figure 4:
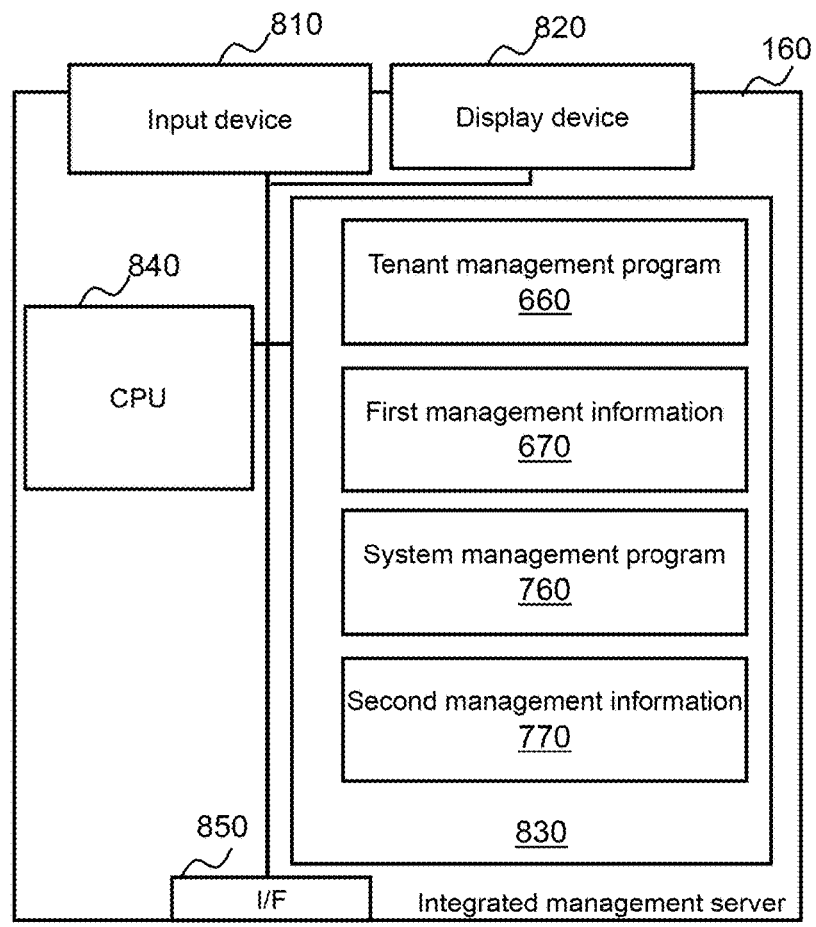
FIG. 4 shows a configuration example of an integrated management server.

FIG. 4 shows a configuration example of the integrated management server 160.

The integrated management server 160 includes an input device (e.g., a keyboard and a pointing device) 810, a display device 820, an I/F (an interface device) 850 coupled to the XaaS resource management server 140 and the common resource management server 130 (and the computer system 120), a storing unit 830 (e.g., a memory) that stores a computer program and information, and a CPU 840 coupled to the input device 810, the display device 820, the I/F 850, and the storing unit 830. The input device 810 and the display device 820 may be integral like a touch panel. The integrated management server 160 may be coupled to a computer for display (e.g., a personal computer operated by the system administrator) including an input device and a display device instead of the input device 810 and the display device 820. The computer program stored by the storing unit 830 is, for example, a tenant management program 660 and a system management program 760. The tenant management program 660 and the system management program 760 are executed by the CPU 740. The information stored by the storing unit 730 is, for example, the first management information 670 and the second management information 770.

Figure 13:
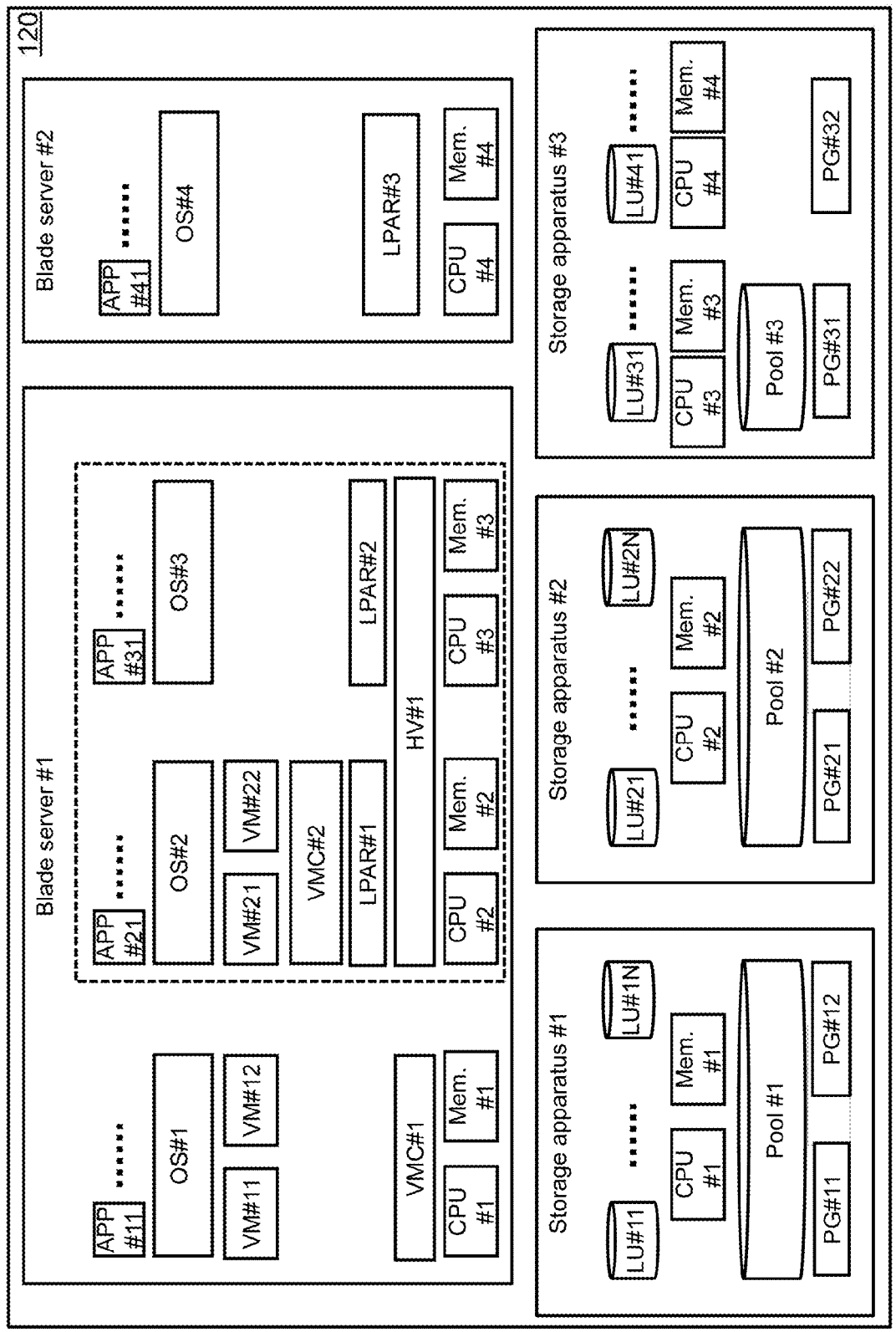
FIG. 13 shows an example of the configuration of a plurality of resources in the computer system.

FIG. 13 shows an example of the configuration of a plurality of resources in the computer system 120.

Various configurations can be adopted as a resource configuration (e.g., a resource dependence relation from a high order to a low order) of the computer system 120 according to resource conditions (e.g., performance and capacities) designated in a resource allocation request from the tenant administrator, resource allocation control by the system administrator, or the like.

For example, concerning the blade server 210, a VM is sometimes absent, may be executed on VM control software (VMM: Virtual Machine Monitor), or may be executed on a hypervisor (HV). The VMM may be executed on the HV or may be executed on an LPAR (a logical machine in a large concept than the VM). The LPAR may be executed on the HV. The LPAR may be absent. One or more APPs may be executed on an OS. A resource on which at least one of the VMM, the HV, the LPAR, the VMM, and the OS (e.g., directly) depends may be a physical resource such as a CPU or a memory. A virtual blade server 210 may be constructed in one blade server 210 or across two or more blade servers 210. The virtual blade server 210 may include two or more resources from the physical resource (e.g., the CPU or the memory) to an APP.

For example, concerning the storage apparatus 220, a pool is sometimes absent. The storage apparatus 220 provides an LU (an online VOL) to the blade server 210 (e.g., a VM or an LPAR). The storage apparatus 220 receives an I/O request, which designates the LU, from the blade server 210. The storage controller 400 (the CPU 420) in the storage apparatus 220 performs I/O to and from an LU area (e.g., I/O to and from a PG area on which the LU area depends or I/O to and from a PG area on which an actual area allocated to the LU area (a virtual area) depends) according to the I/O request. In that case, data of an I/O target may be temporarily written in the memory. The virtual storage apparatus 220 may be constructed in one storage apparatus 220 or across two or more storage apparatuses 220. The virtual storage apparatus 220 may include two or more resources from physical resources (e.g., the storage controller 400 and the PDEV 460) to the LU.

A part of the computer system 120 may be managed by the XaaS resource management server 140 and the remainder may be managed by the common resource management server 130. As explained above, in this embodiment, the management system 170 may include at least the common resource management server 130 of the XaaS resource management server 140 and the common resource management server 130. Management information stored by the management system 170 may be information including first management information 670 stored by the XaaS resource management server 140 and the second management information 770 stored by the common resource management server 130.

Tables included in the first management information 670 and the second management information 770 are explained below. First, the tables included in the first management information 670 are explained with reference to FIGS. 14 to 17.

FIG. 14 shows a configuration example of the tenant management table 1400.

The tenant management table 1400 retains information concerning a management target tenant of the tenant administrator. The tenant management table 1400 includes records for each tenant. As information stored by the records, there are a tenant ID 1401, a tenant name 1402, a tenant detail 1403, a tenant environment ID 1404, and a charged amount

1405. The tenant ID 1401 is an ID of the tenant. The tenant name 1402 represents a name of the tenant. The tenant detail 1403 is information including details concerning the tenant. The tenant environment ID 1404 is an ID of a tenant environment. The charged amount 1405 represents an amount charged according to use of the tenant environment.

FIG. 15 shows a configuration example of the tenant environment management table 1500.

The tenant environment management table 1500 retains information concerning a management target tenant environment of the tenant administrator. The tenant environment management table 1500 includes records for each tenant environment. As information stored by the records, there are a tenant environment ID 1501, a service model name 1502, an allocated resource ID 1503, a dependence destination resource ID 1504, and a high-order resource ID 1505. The tenant environment ID 1501 is an ID of a tenant environment. The service model name 1502 represents a name of an XaaS type corresponding to the tenant environment (a tenant). The allocated resource ID 1503 is an ID of a resource allocated to the tenant environment (a tenant-environment allocated resource). The dependence destination resource ID 1504 is an ID of a resource on which the tenant-environment allocated resource depends. The high-order resource ID 1505 is an ID of a high-order resource higher in order than the tenant-environment allocated resource. When a plurality of high-order resources having a dependence relation are present, the high-order resource ID 1505 may represent a dependence relation among high-order resources besides IDs of the high-order resources. The high-order resource ID 1505 may be updated every time the high-order resource on the tenant-environment allocated resource increases or decreases.

FIG. 16 shows a configuration example of the service model management table 1600.

The service model management table 1600 retains information concerning a service model (an XaaS type). The service model management table 1600 includes records for each service model. As information stored by the records, there are a service model name 1601 and an allocated resource type 1602. The service model name 1601 represents a name of an XaaS type. The allocated resource type 1602 represents a type of a tenant-environment allocated resource conforming to an XaaS type associated with the allocated resource type 1602.

FIG. 17 shows a configuration example of the resource individual management table 1700.

The resource individual management table 1700 retains information concerning a management target resource of the tenant administrator. The resource individual management table 1700 includes records for each management target resource. As information stored by the records, there are a resource ID 1701, a resource category 1702, a state 1703, and a detail 1704. The resource ID 1701 is an ID of a resource. The resource category 1702 represents a category of the resource. As the category, there are, for example, a "tenant-environment allocated resource", a "high-order resource", a "low-order resource", and an "unallocated resource". The state 1703 represents a state of the resource. As the state 1703, there are, for example, "operating", "stopped", and "damaged". A value of the state 1703 may be determined, for example, on the basis of a monitoring result of a resource corresponding to the state 1703. The detail 1704 includes detailed information concerning the resource. For example, the detail 1704 may include, as details concerning a tenant-environment allocated resource corresponding to a PaaS, information representing an execution environment requirement during generation, a mounted middleware type, a list of information concerning a VM in use, and a data storage destination as information concerning a PaaS execution environment. For example, the detail 1704 may include, as details concerning the VM, information concerning a CPU of the VM, information concerning a memory of the VM, information concerning a virtual disk of the VM, information concerning a storage destination storage area of the virtual disk of the VM (e.g., information representing a position on an internal file system), an ID of a boot image, and an ID of a server execution environment of a server used by the VM. The server used by the VM may mean the blade server 210 or may mean an LPAR. The information concerning the server execution environment may include information concerning a CPU of a server corresponding to the environment (e.g., the number of CPUs and the number of CPU cores), information concerning a memory of the server (e.g., a memory capacity), information concerning a network interface of the server (e.g., a type of an NIC and a MAC address), information concerning an I/O interface (e.g., an HBA (Host Bus Adapter)) of the server (e.g., a type of the HBA and a WWN (World Wide Name)), information concerning an LU recognized by the server via the I/O interface (e.g., a peculiar ID (e.g., a combination of a serial number of the storage apparatus 220 and an LUN) and a capacity of an LU), and information concerning a storage port (a port of the FE-I/F 310 included in a storage controller). The peculiar ID is information used for determining, for example, when the same LU is accessed from a plurality of storage ports through a multipath, whether the LU is the same LU.

The tables shown in FIGS. 14 to 17 above are tables included in the first management information 670. Note that, even if information concerning a tenant-environment allocated resource is included in the first management information 670, information concerning a high-order resource and a dependence destination resource may not be included in the first management information 670. As the information concerning the high-order resource, client computers (not shown in the figure) of the XaaS resource management server 140 may construct one or more high-order resources in any dependence relation on the tenant-environment allocated resource and retain information concerning the constructed one or more high-order resources. The XaaS resource management server 140 may secure a resource serving as a spare beforehand (in this case, the state 1703 "spare" may be registered in the table 1700) or execution environment information of a deleted resource (information necessary for executing a resource (e.g., an instance such as login information)) may be managed as a spare.

A table included in the second management information 770 is explained with reference to FIGS. 18 to 23.

FIG. 18 shows a configuration example of the administrator management table 1800.

The administrator management table 1800 retains information concerning the tenant administrator and the system administrator. The administrator management table 1800 includes records for each administrator. As information stored by the records, there are an administrator ID 1801, an administrator type 1802, and a tenant environment ID 1803. The administrator ID 1801 is an ID of the administrator. The administrator type 1802 represents a type of the administrator (e.g., which of the tenant administrator and the system administrator the administrator is). The tenant environment ID 1803 is an ID of a tenant environment corresponding to the administrator. The tenant environment ID 1803 corresponding to the system administrator may be a value (e.g., "-") that means that the system administrator is capable of managing all of provided tenant environments.

FIG. 19 shows a configuration example of the tenant environment management table 1900.

The configuration of the tenant environment management table 1900 in the second management information 770 may be the same as the configuration of the tenant environment management table 1500 in the first management information 670. That is, the tenant environment management table 1900 includes records for each tenant environment. As information stored by the records, there are a tenant environment ID 1903, a service model name 1902, an allocated resource ID 1903, a dependence destination resource ID 1904, and a high-order resource ID 1905. Every time a high-order resource on a tenant-environment allocated resource increases or decreases, an ID of the increased or decreased high-order resource is notified from the XaaS resource management server 140. The system management program 760 may add or delete the notified ID to and from the high-order resource ID 1905. Note that a column of the high-order resource ID 1905 may be absent in the tenant environment management table 1900 in the second management information 770.

FIG. 20 shows a configuration example of the resource management table 2000.

The resource management table 2000 retains information concerning resources. The resource management table 2000 includes records for each resource. As information stored by the records, there are a resource type, a resource ID 2002, a resource category 2003, a dependence destination resource ID 2004, a state 2005, and a detail 2006. The resource type represents a type of the resource. The resource ID 2002 is an ID of the resource. The resource category 2003 represents a category of the resource (to which of a high-order resource, a tenant-environment allocated resource, a low-order resource, and an unallocated resource the resource corresponds). The dependence destination resource ID 2004 is an ID of a dependence destination resource (a child resource) of the resource. The state 2005 represents a state of the resource and includes at least one of, for example, "operating", "stopped", "damaged", "unallocated (idle)", "secured (a securing source tenant administrator ID 1801=Administrator #1)", "occupied", and "shared". The detail 2006 includes information concerning details of the resource. The detail 2006 may be the same as, for example, the detail 1703 explained with reference to FIG. 17.

Note that, concerning the state 2006, the "occupied" means an occupied resource. The occupied resource means that the resource and a high-order resource of the resource correspond to only one tenant administrator (tenant) (in other words, do not correspond to a plurality of tenant administrators). On the other hand, the "shared" means a shared resource. The shared resource means that the resource and a high-order resource of the resource correspond to a plurality of tenant administrators. The "occupied" and the "shared" are states in which the resource is associated with a dependence destination resource and at least one of resources lower in order than the dependence destination resource. All of the low-order resources of the shared resource may be treated as shared resources. Allocation control for preventing the low-order resources of the occupied resource from being set as shared resources as much as possible (for maintaining the low-order resources as the occupied resources as much as possible) may be performed by the system management program 760.

FIG. 21 shows a configuration example of the operation authority management table 2100.

The operation authority management table 2100 retains information concerning operation authority of various administrators. The operation authority management table 2100 indicates, concerning each of the tenant administrator and the system administrator (the administrator type 1802), for each resource category 2003 (the resource category 2003), whether reference to information concerning resources is permitted (reference to the operation authority) and whether a change of the information concerning the resources is permitted (a change of the operation authority).

According to an example shown in FIG. 21, the tenant administrator has operation authority for reference and a change concerning a tenant-environment allocated resource and a high-order resource. However, the tenant administrator does not have the operation authority for reference and a change concerning a low-order resource and an unallocated resource. Note that the "unallocated resource" is a resource not allocated to all of tenant administrators (tenants) (a resource corresponding to none of the high-order resource, the tenant-environment allocated resource, and the low-order resource).

On the other hand, the system administrator does not have the operation authority for reference and a change concerning the high-order resource. The system administrator has the operation authority for reference but does not have the operation authority for a change concerning the tenant-environment allocated resource. The system administrator has the operation authority for reference and a change concerning the low-order resource and the unallocated resource.

According to the example shown in FIG. 21, for example, the following holds true. When receiving a request from the first tenant administrator, the system management program 760 (a) executes, if a resource operated in processing conforming to the received request is a resource allocated to the first tenant (a tenant corresponding to the first tenant administrator), the processing conforming to the request and (b) rejects, if the resource operated in the processing conforming to the received request is a resource allocated to a tenant other than the first tenant, the processing conforming to the request. When receiving a request from the system administrator of the computer system, the system management program 760 executes processing based on content of processing conforming to the received request and authority allocated to the system administrator.

FIG. 22 shows a configuration example of the dependence relation management table 2200.

The dependence relation management table 2200 retains information concerning a dependence relation of resource types. The dependence relation management table 2200 includes records for each resource type. As information stored by the records, there are a resource type name 2001 and a dependence destination resource type name 2002. The resource type name 2001 represents a name of the resource type. The dependence destination resource type name 2002 represents a name of a resource type of a resource that could be a dependence destination of a resource belonging to the resource type. A plurality of dependence destination resource types are sometimes present concerning one resource type.

A dependence relation represented by the dependence relation management table 2200 represents a resource-type dependence relation that could be constructed in the computer system 120. An actual dependence relation of a plurality of resources is constructed in a range allowed by the dependence relation management table 2200. The actual dependence relation is represented by the resource management table 2000.

FIG. 23 shows a configuration example of the monitoring table 2300.

The monitoring table 2300 retains information concerning a monitoring result (a monitoring result concerning resources of the computer system 120) by the system management program 760. The monitoring table 2300 may include, for example, a time point (information representing a time point when the monitoring result is acquired) 2301 and a monitoring result (information representing a monitoring result (e.g., a metric value and a resource state)) 2302. A monitoring result by the tenant management program 660 (a monitoring result received from the tenant management program 660 by the system management program 760) may be merged with the monitoring table 2300. For example, the system management program 760 may monitor a low-order resource. The tenant management program 660 may monitor a tenant-environment allocated resource and a high-order resource.

FIG. 24 shows a configuration example of the resource group management table 2400.

The resource group management table 2400 retains information concerning a resource group. The resource group is a set of resources allocated to one tenant administrator (tenant). That is, the resource group includes not only a tenant-environment allocated resource but also at least one of a high-order resource and a low-order resource. The resource group management table 2400 includes records for each resource group. As information stored by the records, there are a resource group ID 2401, an administrator ID 2402, a group configuration 2403, and an operation authority detail 2404. The resource group ID 2401 is an ID of a resource group. The administrator ID 2402 is an ID of an administrator. The group configuration 2403 is a list of IDs of resources included in the resource group. The operation authority detail 2404 includes information concerning operation authority concerning the resource group. According to the operation authority detail 2404, for example, if an administrator ID corresponding to an administrator who issues a request concerning operation of a resource (e.g., reference or a change (e.g., allocation) of information concerning the resource) coincides with the administrator ID 2402 corresponding to a resource group including the resource, the operation is limited by the system management program 760 according to operation authority specified in the operation authority management table 2100. On the other hand, if an administrator ID corresponding to an administrator who issues a request concerning operation of a resource does not coincide with the administrator ID 2402 corresponding to a resource group including the resource, the operation is rejected by the system management program 760.

The tables included in the second management information 770 are as explained above. Note that, in the second management information 770, the information concerning the high-order resource and the tenant-environment allocated resource may be transmitted to the XaaS resource management server 140 corresponding to an XaaS of a tenant system corresponding to the resources. Control may be performed by the tenant management program 660 on the basis of the information. In other words, a part of the control performed by the system management program 760 may be offloaded to the tenant management program 660. For example, operation of at least one of the high-order resource and the tenant-environment allocated resource may be limited by the tenant management program 660.

Processing performed in this embodiment is explained below. In the processing explained below, the integrated management server of the management system 170, the XaaS resource management server 140, and the common resource management server may respectively perform update of the first management information 670 and the second management information 770 as appropriate (at the time of processing including update of information or at regular or irregular timing) and notify information necessary for update of the first management information 670 and the second management information 770 to one another. The integrated management server of the management system 170, the XaaS resource management server 140, and the common resource management server respectively acquire or calculate information necessary in processing explained below on the basis of the first management information 670 and the second management information 770.

FIG. 25 shows an overview of a flow of processing performed in response to a request from the tenant administrator.

In S2501, the tenant management program 660 of the integrated management server 160 receives a request (e.g., a resource allocation request) of the tenant administrator through the input device 810. The integrated management server 160 transmits, on the basis of a type of a requested XaaS, the request of the tenant administrator to the XaaS resource management server 140 corresponding to the type of the XaaS. For example, when a tenant environment of a PaaS is requested from the tenant administrator or when a request is received from the tenant system 110 to which the tenant environment of the PaaS is provided, the integrated management server 160 transmits a request (e.g., a resource allocation request) of the tenant administrator to the PaaS resource management server 140-1 for the PaaS. The integrated management server 160 manages types of XaaSs and the XaaS resource management servers 140 corresponding to the XaaSs in association with each other.

The XaaS resource management server 140 executes processing based on the received request of the tenant administrator. For example, the XaaS resource management server 140 requests the common resource management server 130 to allocate a resource. The request may be any one of, for example, an environment construction request (a request for construction of a new tenant environment), a resource change request (a request for a change of a resource allocated to an existing tenant environment), a service model change request (a request for a change of an XaaS type), and a resource reference request (a display request for information concerning a resource). The change of a resource may be any one of, for example, addition of a resource allocated to the existing tenant environment, removal of any one of tenant-environment allocated resources from the existing tenant environment, and a change of a tenant-environment allocated resource dependent on a high-order resource (migration of the high-order resource).

In S2502, the common resource management server 130 receives the request. The system management program 760 determines, referring to at least one of the operation authority management table 2100 and the resource group management table 2400, whether the tenant administrator at the transmission source has operation authority for processing (operation) conforming to the request. For example, in the table reference, the system management program 760 can specify, as an administrator ID corresponding to the request source administrator (the tenant administrator at the transmission source of the request), an administrator ID input during login of the tenant administrator (or an administrator ID associated with the request received from the XaaS resource management server 140). In S2502, for example, any one kind of processing or two or more kinds of processing among (x1) to (x2) described below may be performed.

(x1) The system management program 760 specifies that the request source administrator is the tenant administrator and determines presence or absence of operation authority on the basis of a type of an operation target resource conforming to the received request, a kind of the request (reference or a change of the resource), and the operation authority management table 2100.

(x2) When the operation target resource can be specified from the received request, the system management program 760 determines on the basis of the resource group management table 2400 whether an administrator ID corresponding to a resource group including an ID of the resource and the specified administrator ID coincide with each other. The tenant management program 660 determines presence or absence of operation authority on the basis of a result of the determination. In this embodiment, one common resource management server 130 is shared by a plurality of tenant administrators. However, a resource group is managed for each tenant. When there is an operation request, it is possible to determine whether the request source administrator is the tenant administrator corresponding to the operation target resource. Presence or absence of execution of processing conforming to the request is controlled according to a result of the determination. Therefore, for example, it is possible to prevent a resource corresponding to the tenant administrator from being changed or referred to by the tenant administrators other than the tenant administrator. Specifically, for example, if an administrator ID of an administrator who issues an operation request coincides with an administrator ID corresponding to a resource group including the resource, the operation is controlled by the system management program 760 according to the operation authority specified in the operation authority management table 2100. On the other hand, if the administrator ID of the administrator who issues the operation request does not coincide with the administrator ID corresponding to the resource group including the resource, the operation is rejected by the system management program 760. That is, when the received request is a request from a first user administrator, who is a user administrator corresponding to a first user, if a resource operated in processing conforming to the request is a resource allocated to the first user, the system management program 760 of the management system 170 executes the processing conforming to the request. If the resource operated in the processing conforming to the request is a resource allocated to a user other than the first user, the system management program 760 of the management system 170 rejects the processing conforming to the request.

When the determination result in S2502 is "authority is present", in S2503, the system management program 760 executes processing conforming to the request received in S2502. For example, the processing is as described in (A) to (D) below.

(A) When the Request is an Environment Construction Request

The management system 170 including the CPU (the processor) that executes the system management program 760 allocates, among a plurality of resources including a plurality of resource types included in the computer system 120, resources of resource types different depending on a type of an XaaS (X as a Service) to the tenant environment and provides a plurality of tenant environments including a plurality of XaaSs. The management system 170 including the CPU (the processor) that executes the system management program 760 manages, among the plurality of resources including the plurality of resource types of the computer system 120, as low-order resources, resources lower in order than resources allocated to the tenant environments. For example, the management system 170 records, concerning the respective resources lower in order than the resources allocated to the tenant environments, the resource category 2003 in the resource management table 2000 as a low-order resource. Note that the management system 170 may record, concerning a respective plurality of resources of the computer system, the resource category 2003 of any one of a tenant-environment allocated resource, a high-order resource, a low-order resource, and an unallocated resource in the resource management table 2000 and manage the resource category 2003.

(A1) The system management program 760 registers a new tenant environment ID and a service model name associated with the tenant environment ID in the tenant environment management table 1900. The service model name to be registered may be a service model name associated with an environment construction request (a designated service model name). The system management program 760 adds the new tenant environment ID to a record corresponding to the request source administrator (update of the administrator management table 1800).

Figure 26:
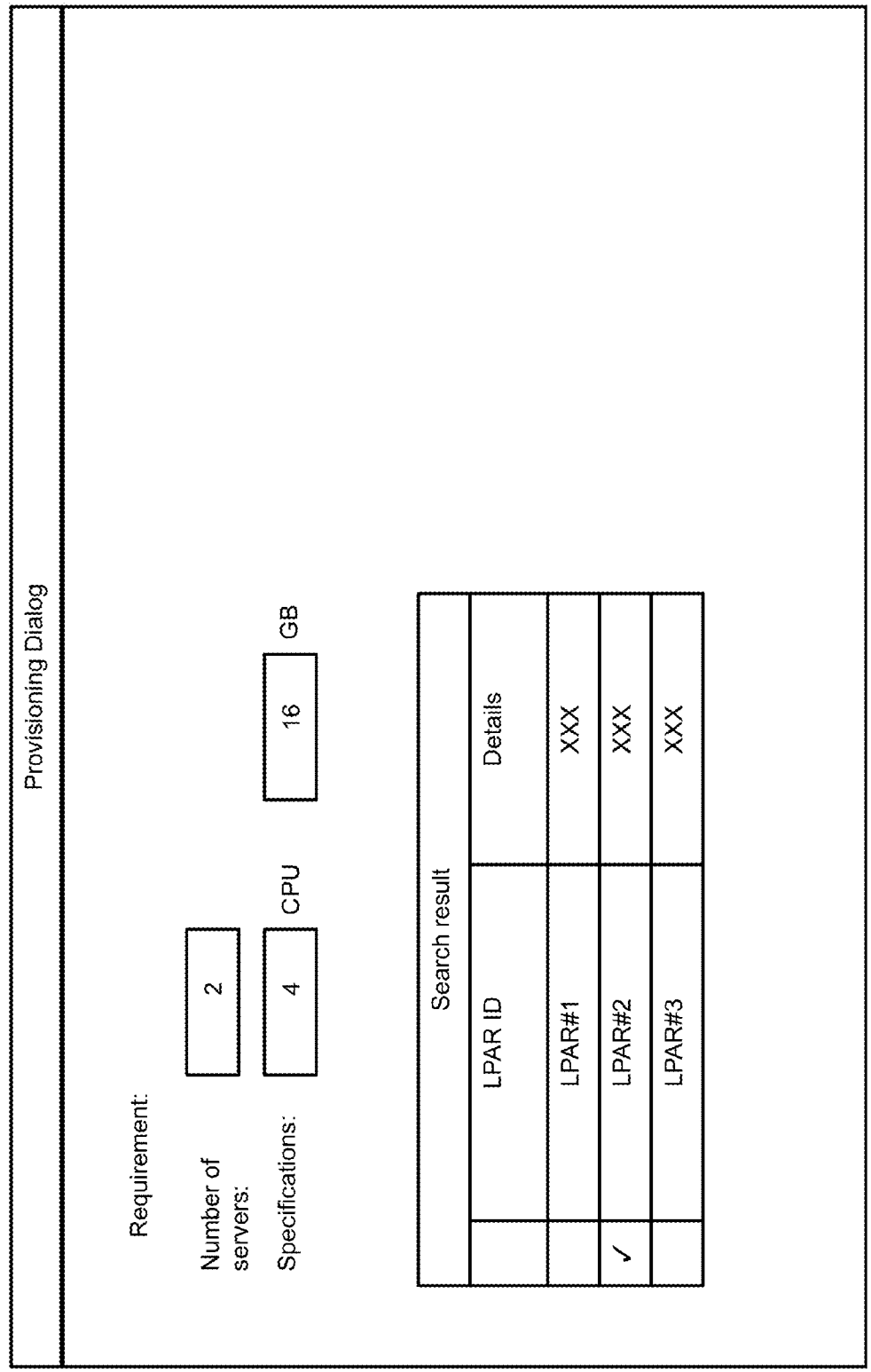
FIG. 26 shows an example of a search result screen.

(A2) The system management program 760 acquires, on the basis of the service model management table 1600, an allocated resource type corresponding to the service model name (the designated service model name). The system management program 760 finds, from the resource management table 2000, a resource of the allocated resource type corresponding to the designated service model name (resource type). One or more resources (e.g., resources in the state "operating") matching a condition associated with the environment construction request (e.g., a condition designated from the request source administrator) may be searched. FIG. 26 shows an example of a search result screen. The screen is an example of a screen for environment construction corresponding to an LPARaaS. With the screen, a search result concerning the condition designated from the request source administrator (e.g., a list of found tenant-environment allocated resource candidates and details of the resource candidates) is displayed. The details of the resource candidates may be performance and amounts concerning dependence destination resources of the resource candidates. The system management program 760 may search for low-order resource candidates. However, the system management program 760 does not include the low-order resource candidates in the search result serving as a display target. This is because the low-order resource candidates are information that the tenant administrator does not need to know.

(A3) The system management program 760 receives selection of a resource candidate (a tenant-environment allocated resource candidate) desired by the request source administrator out of the search result. The system management program 760 registers an ID of the selected resource candidate (an ID of the tenant-environment allocated resource candidate and an ID of a dependence destination resource of the tenant-environment allocated resource candidate) in the tenant environment management table 1900. As a result, a resource is allocated to the tenant environment. The system management program 760 adds the selected resource candidate (ID) to a resource group (the group configuration 2403) corresponding to the request source administrator (update of the resource group management table 2400). The system management program 760 updates the resource management table 2000 concerning the selected resource candidate and the low-order resource of the selected resource candidate.

Note that, in (A2), the system management program 760 may find the resource of the allocated resource type corresponding to the designated service model name (resource type) preferentially from unallocated resources (resources in the state "unallocated"). The system management program 760 of the management system 170 selects, as a resource allocated to a user at a request source (e.g., a tenant-environment allocated resource), a resource managed as an unallocated resource not allocated to all of the plurality of users and allocates the resource. When low-order resources of one or more provisioning resources corresponding to the other users and the unallocated resource not allocated to all of the plurality of users can be allocated to the user at the request source, the system management program 760 of the management system 170 may preferentially select and allocate the unallocated resource. The system management program 760 may generate, on the basis of a low-order resource or an unallocated resource corresponding to another tenant administrator (a tenant administrator different from the request source administrator), a resource of an allocated resource type corresponding to the designated service model name (resource type). The system management program 760 may prioritize a secured resource corresponding to the request source administrator more than the unallocated resource. Each of the dependence destination resources of the tenant-environment allocated resource candidates is an unallocated resource (a resource dynamically generated anew may be an example of the "unallocated resource") or a common resource among low-order resources corresponding to the other tenant administrator. The system management program 760 may more preferentially search for, as the dependence destination resources of the tenant-environment allocated resource candidates, shared resources than occupied resources among the low-order resources corresponding to the other tenant administrator. The system management program 760 may not set, as candidates, occupied resources among the low-order resources corresponding to the other tenant administrator as the dependence destination resources of the tenant-environment allocated resource candidates.

(A4) The system management program 760 finds a resource lower in order than the selected resource (tenant-environment allocated resource) as well from the resource management table 2000 and associates the found resource with the tenant-environment allocated resource registered in (A3) as a low-order resource.

In (A4), the system management program 760 may more preferentially search for the unallocated resource than the low-order resources corresponding to the other tenant administrator. The system management program 760 may prioritize the secured resource corresponding to the request source administrator more than the unallocated resource. Among the low-order resources corresponding to the other tenant administrator, the system management program 760 may more preferentially search for a shared resource than occupied resources as low-order resources. The system management program 760 may not set occupied resources among the low-order resources corresponding to the other tenant administrator as candidates. The unallocated resource or the shared resource among the low-order resources corresponding to the other tenant administrator is selected as a low-order resource.

(B) When the Request is a Resource Change Request (B1) When receiving a change request for a resource, the management system 170 including the CPU (the processor) that executes the system management program 760 refers to the resource management table 2000 and executes processing conforming to the resource change request (change processing) on at least one or more low-order resources among resources managed as low-order resources. For example, the management system 170 that executes the system management program 760 performs, as the change processing, such that performance or amounts of dependence destination resources of one or more tenant-environment allocated resources before the change processing and performance or amounts of the dependence destination resources of the one or more tenant-environment allocated resources after the change processing are the same, processing for changing a dependence relation between the one or more tenant-environment allocated resources and the low-order resources of the tenant-environment allocated resources. For example, the management system 170 that executes the system management program 760 may refer to the tenant environment management table 1900 and the resource management table 2000, specify dependence destination resources from the dependence destination resource IDs 1904 and 2004, and acquire performance or amounts of the resources from the detail 2006. Note that, when a resource corresponding to the request source administrator (the designated resource environment ID) increases or decreases according to the processing conforming to the request, the system management program 760 updates at least one of the tenant environment management table 1900, the resource management table 2000, and the resource group management table 2400.

(C) When the Request is a Service Model Change Request (C1) The system management program 760 specifies a service model (an XaaS type) corresponding to the tenant environment ID 1803 specified from a service model change request.

(C2) The system management program 760 searches for, on the basis of the resource management table 2000, tenant-environment allocated resource candidates and dependence destination resource candidates conforming to a service model after a change specified from the service model change request (or generates resources anew) to thereby obtain the tenant-environment allocated resource candidates and the dependence destination resource candidates. The tenant-environment allocated resource candidates to be obtained may be unallocated resources (resources generated anew) or shared resources among the low-order resources corresponding to the other tenant administrator. The candidates to be obtained may be candidates automatically narrowed down by the system management program 760 or may be candidates selected by the request source administrator from a list of found candidates.

(C3) The system management program 760 determines on the basis of results of (C1) and (C2) whether a service model change is possible. When a result of the determination is negative, the service model change is rejected.

(C4) When the determination result of (C3) is affirmative, the system management program 760 associates, with the tenant environment specified in (C1), an ID of each of a tenant-environment allocated resource and a dependence destination resource of the tenant-environment allocated resources selected in (C2) instead of an ID of each of a tenant-environment allocated resource and a dependence destination resource of the tenant-environment allocated resource before the service model change (update of the tenant environment management table 1900).

Note that, in (C), if the service model change is a change for changing a type of the tenant-environment allocated resource to a higher-order type like a change from an IaaS to a PaaS, the system management program 760 may set a high-order resource on the tenant-environment allocated resource before the change as a tenant-environment allocated resource conforming to the service model after the change. In the service model change, the system management program 760 performs resource selection in which data in an LU corresponding to a tenant is not updated or restart for, for example, recognition of a path from the tenant system 110 to the LU is unnecessary. For example, even of the LU is changed, by migrating the data in the LU to the LU after the change, the system management program 760 enables the tenant system 110 to use a path before the service model change even after the service model change.

(D) When the Request is a Resource Reference Request (D1) The system management program 760 specifies resources (a tenant-environment allocated resource and a dependence destination resource of the tenant-environment allocated resource) corresponding to the request source administrator from the administrator management table 1800 and the tenant environment management table 1900.

(D2) The system management program 760 displays a list of the resources specified in (D1) to the request source administrator. Information concerning a low-order resource corresponding to the request source administrator is not included in the resource list.

Figure 27:
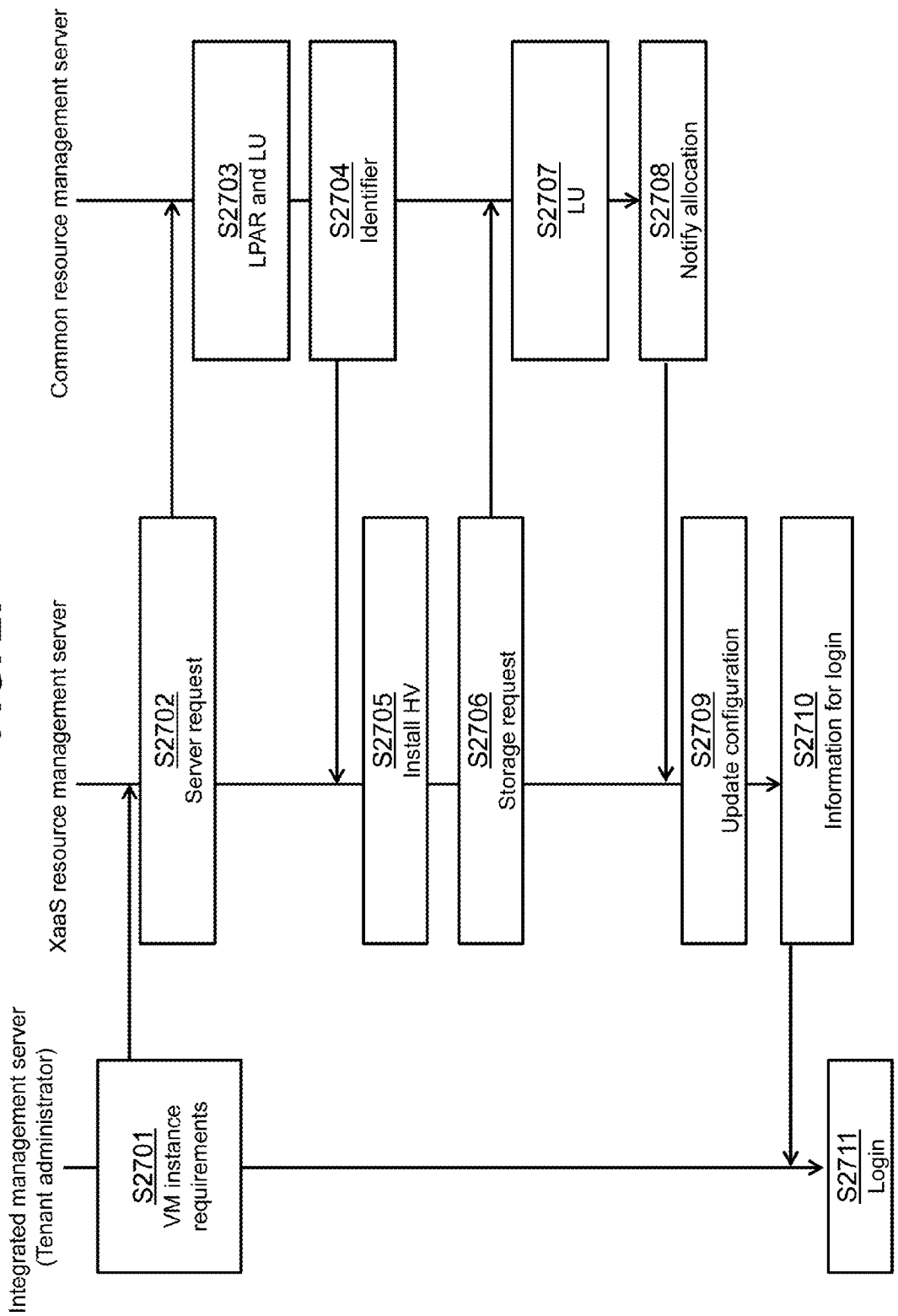
FIG. 27 shows a specific example of execution environment construction of a VMaaS.

FIG. 27 shows a specific example of execution environment construction of a VMaaS. Explanation is omitted or simplified concerning points common to the explanation of FIG. 25.

In S2701, the integrated management server 160 receives an input of a request associated with conditions of a VM (VM instance requirements) from the tenant administrator and transmits a request to the XaaS resource management server 140.

In S2702, the tenant management program 660 of the XaaS resource management server 140 transmits, in response to the request, the input request associated with the VM conditions to the common resource management server 130. The VM conditions associated with the request may include, as conditions concerning the VM, conditions concerning an LU provided to the VM.

In S2703, the system management program 760 of the common resource management server 130 receives the request and selects an LPAR (and an LU) matching the conditions associated with the received request by referring to the second management information 770. The "select" may include dynamic creation of an LPAR matching the conditions. The system management program 760 updates the second management information 770 including the resource management table 2000.

In S2704, the system management program 760 transmits an identifier for managing the selected (generated) LPAR to the XaaS resource management server 140 at the request source.

In S2705, the tenant management program 660 installs a HV (hypervisor) in the LPAR (a server) having the identifier transmitted from the system management program 760. Thereafter, the tenant management program 660 acquires configuration information of the LPAR (and the LU) from the HV.

In S2706, the tenant management program 660 transmits, to the common resource management server 130, a request associated with conditions concerning a storage area associated with the LPAR and an ID (a server ID) of the LPAR.

In S2707, the system management program 760 receives the request and selects, by referring to the second management information 770, an LU matching the conditions associated with the received request. The "select" may include dynamic creation of an LU matching the conditions. The system management program 760 updates the second management information 770 in order to, for example, configure the LU to be accessible from a designated server (LPAR).

In S2708, the system management program 760 transmits information concerning LU allocation completion to the XaaS resource management server 140. The information may include at least one of information concerning the configuration of the blade server 210 (e.g., information more detailed than information managed by the XaaS resource management server 140 (e.g., information representing a fan, a power supply, and physical disposition on the blade server 210)), information concerning the configuration of the LPAR (e.g., information representing a relation between the blade server 210 and the LPAR), information concerning a storage configuration, and information concerning coupling of the LPAR and the LU (e.g., network coupling information).

In S2709, the tenant management program 660 causes, on the basis of the information from the system management program 760, the tenant system 110 to recognize an LU (a storage area) allocated to the HV anew and thereafter updates the information concerning the configuration via the HV. Note that information necessary in this case (information referred to by the tenant management program 660) may include at least one of information concerning the configuration of the blade server 210, information concerning the LU (e.g., an LUN, a capacity, and a coupling destination LPAR), information concerning the configuration of the VM (e.g., a memory, a CPU capacity, a virtual network, and a virtual disk), information concerning a correspondence relation between the virtual disk and the storage area (the LU), information concerning an OS that executes the VM (e.g., an OS image), an IP address, and information for login to the VM (e.g., a password).

In S2710, the tenant management program 660 instructs creation of a VM of an instance type designated in the HV, applies an OS image designated by an option to the VM, and acquires information for VM login (e.g., an IP address and a password). The tenant management program 660 stores a result of the acquisition of the information for VM login in the first management information 670 and transmits the result to the integrated management server 160. The integrated management server 160 notifies the information for VM login (e.g., the IP address and the password) to the tenant administrator.

In S2711, the tenant administrator logs in to the VM using the notified information for VM login and uses the VM.

Note that, in the above processing, S2702 to S2705 may be performed when the tenant management program 660 determines that the LPAR (the server) runs short of a capacity. S2706 to S2709 may be performed when the tenant management program 660 determines that the storage area runs short. Concerning the tenant administrator, as the VM conditions (the VM instance requirements), names associated with a CPU capacity (the number of CPUs), a memory capacity, and a virtual disk capacity determined beforehand could sometimes be designated or the capacities rather than the names could sometimes be directly designated. In a resource allocation request (e.g., an environment construction request), an ID of a resource itself does not have to be designated even if a resource type is designated.

Figure 28:
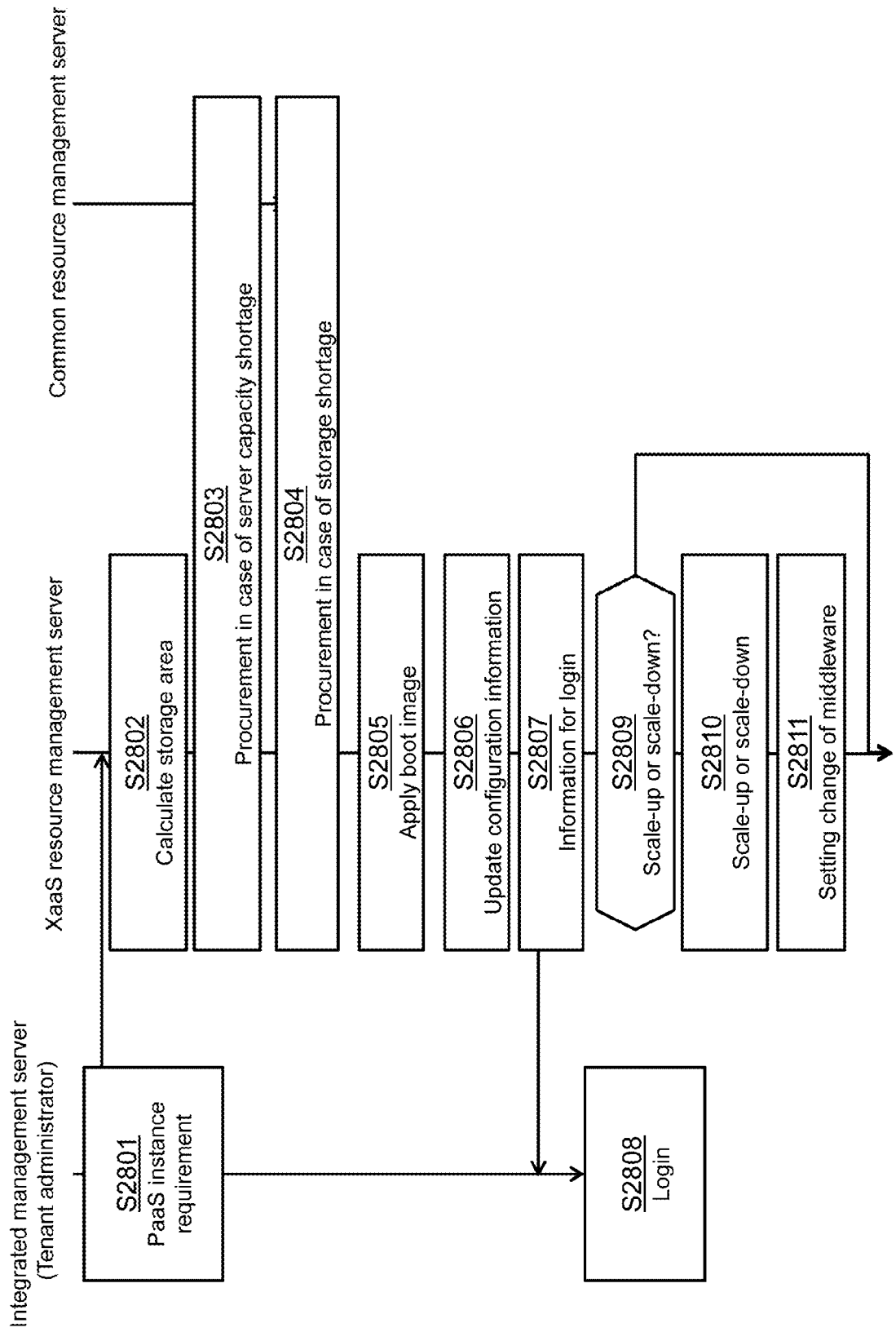
FIG. 28 shows a specific example of execution environment construction of a PaaS.

FIG. 28 shows a specific example of execution environment construction of a PaaS. Explanation is omitted or simplified concerning points common to the explanation of FIG. 25 (and FIG. 27).

In S2801, the integrated management server 160 receives an input of a request associated with conditions of a PaaS (PaaS instance requirements) from the tenant administrator and transmits a request to the XaaS resource management server 140. The PaaS instance requirements may include information concerning a type of necessary middleware (e.g., a Hadoop or a DBMS (Database Management System)) and scales of environments executed in the middleware (e.g., a memory capacity, a storage capacity, and a table size of a database).

In S2802, the tenant management program 660 of the XaaS resource management server 140 calculates, in response to the request, a necessary capacity of the LPAR (server) and a necessary storage area on the basis of the input PaaS conditions.

When the server runs short of a capacity, S2803 is performed. S2803 is processing including S2702 to S2705.

When the storage area runs short, S2804 is performed. S2804 is processing including S2706 to S2709.

In S2805, the tenant management program 660 creates a VM and applies, on the VM, a boot image including middleware based on the PaaS conditions.

In S2806, the tenant management program 660 updates the first management information 670.

In S2807, the tenant management program 660 transmits information for VM login to the integrated management server 160. The integrated management server 160 notifies the information for VM login (e.g., an IP address and a password) to the tenant administrator.

In S2808, the tenant administrator logs in to the VM using the notified information for VM login and uses the VM.

In S2809, the tenant management program 660 determines, for example, by monitoring an OS of the VM, whether scale-up or scale-down is necessary.

When it is determined that the scale-up or the scale-down is necessary, S2810 (the scale-up or the scale-down) is performed. In S2810, when a server (an LPAR) is necessary anew or when an increase of the storage performance is necessary, the tenant management program 660 requests the new server (LPAR) or the increase of the storage performance to the common resource management server 130.

In S2811, the tenant management program 660 changes configuration of the middleware and reflects an added or deleted resource.

Note that, in the processing shown in FIG. 28, the scale-up or the scale-down could be performed by a method explained below. For example, the tenant administrator inputs an instance requirement update request for the scale-up or the scale-down to the XaaS resource management server 140. Alternatively, for example, the tenant management program 660 allocates resources less than a requirement designated from the tenant administrator and increases (or decreases), when necessary, a resource on the basis of a monitoring result.

Information concerning the middleware (e.g., configuration information of the middleware, information representing a correspondence relation between the middleware and the server (LPAR), and monitoring information including an element (e.g., a metric value) used for the determination of the scale-up or the scale-down) may be included in at least one of the first management information 670 and the second management information 770.

Figure 29:
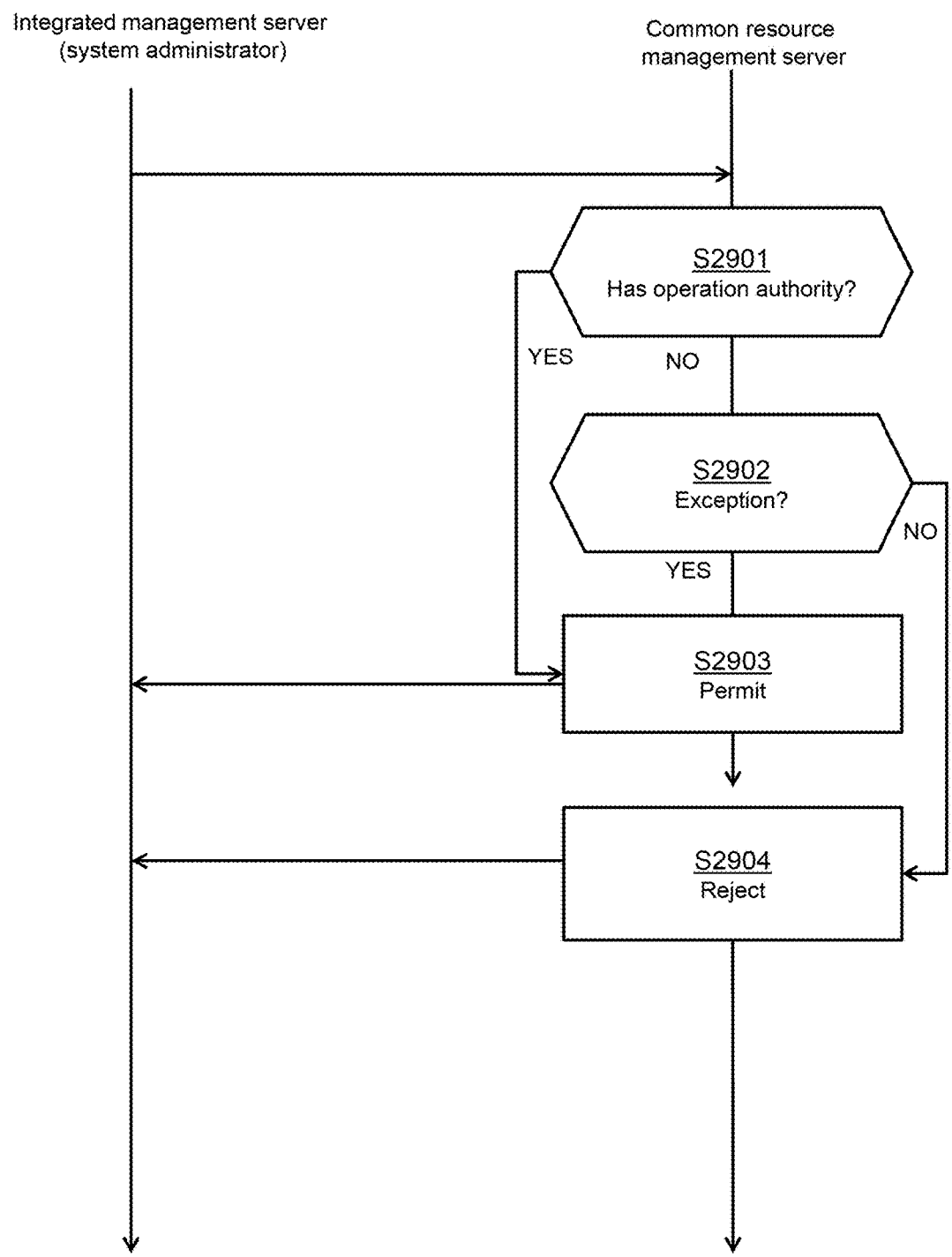
FIG. 29 shows an example of a flow of processing performed in response to a request from a system administrator.

FIG. 29 shows an example of a flow of processing performed in response to a request from the system administrator.

In S2901, the system administrator program determines, by referring to the operation authority management table 2100, whether the system administrator has operation authority for processing (operation) conforming to the request from the system administrator.

When a determination result in S2901 is affirmative, in S2903, the system management program 760 permits processing conforming to the request. That is, the system management program 760 executes the processing.

When the determination result in S2901 is negative, in S2902, the system management program 760 determines whether a predetermined exception condition is satisfied. For example, even in processing for changing a dependence relation between one or more tenant-environment allocated resources and one or more dependence destination resources of the tenant-environment allocated resources, if amounts (or performance) of the one or more dependence destination resources do not change before and after the change, an affirmative determination result (a determination result that the exception condition is satisfied in the processing) is obtained.

When the determination result in S2902 is affirmative, S2903 is performed.

When the determination result in S2902 is negative, in S2904, the system management program 760 rejects execution on the request from the system administrator.

In the following explanation, a specific example of the processing performed by the system management program 760 is explained with reference to FIG. 5 and FIG. 30 to FIG. 33.

Figure 30:
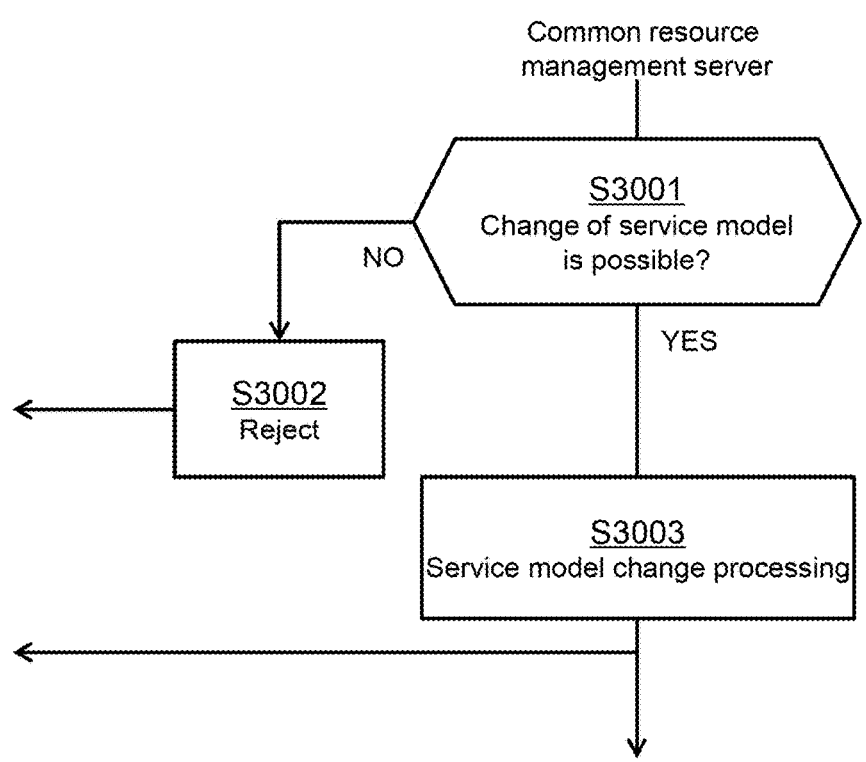
FIG. 30 shows an example of a flow of service model change processing.

FIG. 30 shows an example of a flow of the service model change processing.

In S3001, the system management program 760 specifies a service model (an XaaS type) corresponding to the tenant environment ID 1803 specified from the service model change request. The system management program 760 searches for, on the basis of the resource management table 2000, tenant-environment allocated resource candidates conforming to a service model after a change specified from the service model change request (or generates a resource anew) to thereby obtain the tenant-environment allocated resource candidates. For example, when amounts of the obtained resource candidates are smaller than the condition (including a case in which it is seen that resource candidates satisfying the condition are not obtained), a determination result is negative.

When the determination result in S3001 is negative, in S3002, the system management program 760 returns rejection (an error) to the request source.

When the determination result in S3001 is affirmative, in S3003, the system management program 760 associates an ID of each of an obtained tenant-environment allocated resource and a dependence destination resource of the tenant-environment allocated resource with the specified tenant environment instead of an ID of each of a tenant-environment allocated resource and a dependence destination resource of the tenant-environment allocated resource before the service model change (update of the tenant environment management table 1900).

As specific examples of the service model change processing, <(1) a change from a PaaS to a VMaaS> and <(2)

a change from a VMaaS to a PaaS> are explained. Note that, in this explanation, a PaaS is an example of a first XaaS type and a VMaaS (an example of IaaS) is an example of a second XaaS type. The second XaaS type is an XaaS type lower in order than the first XaaS type (an XaaS type lower, a type of a tenant-environment allocated resource corresponding to which is lower in order).

<(1) A Change from a PaaS to a VMaaS>

(1A) In the service model change request received by the system management program 760, a PaaS execution environment (a tenant environment) is designated.

(1B) The system management program 760 acquires requirements during PaaS execution environment creation (e.g., specifies amounts, performance, and the like of a resource corresponding to the PaaS execution environment by referring to the resource management table 2000 or the like) and specifies a resource that should be allocated to a tenant-environment allocated resource. The specifying of the resource is preferentially performed from a resource already associated with a tenant corresponding to the service model change (in particular, for example, when a load of the PaaS execution environment is lower than a predetermined load).

(1C) When the resource (e.g., the amounts or the performance) specified in (1B) does not meet the condition, the system management program 760 adds a resource and, such that the added resource is recognized by a predetermined resource (e.g., middleware), changes configuration of the predetermined resource.

(1D) The system management program 760 displays information for login to the resource specified in (1B) to the request source administrator (e.g., the system administrator or the tenant administrator).

<(2) A Change from a VMaaS to a PaaS>

(2A) The system management program 760 determines, referring to the second management information 770, whether conversion into a PaaS can be performed in a present VM execution environment (VM instance configuration). For example, the system management program 760 determines whether the VM execution environment is within a range of a condition of a PaaS execution environment after a change (e.g., whether middleware unnecessary in the PaaS execution environment is associated with the VM execution environment).

(2B) When a determination result in (2A) is affirmative, the system management program 760 switches an execution environment (a tenant environment) from the VM execution environment to the PaaS execution environment. Note that, in the switching, data used by the VM (data in a memory) is not erased. For example, the system management program 760 retracts the data used by the VM (the data in the memory) (e.g., to an LU) and stops the VMaaS. The system management program 760 constructs a PaaS execution environment corresponding to the VMaaS and applies the retracted data to the PaaS execution environment. When information for login (e.g., an IP address) changes, the system management program 760 may notify the information for login after the change to the request source administrator (e.g., the tenant administrator or the system administrator).

For example, when an XaaS type corresponding to the first user, who is any one of the users, is changed from the first XaaS type to the second XaaS type, the system management program 760 of the management system 170 may refer to the resource management table 2000 and execute control explained below on the basis of a dependence relation among tenant-environment allocated resources of resource types conforming to a plurality of XaaS types corresponding to a plurality of users. That is, the system management program 760 of the management system 170 may select, as tenant-environment allocated resources, resources in which at least one of a dependence relation between a tenant-environment allocated resource conforming to the first XaaS type corresponding to the first user and a high-order resource of the tenant-environment allocated resource and a dependence relation between the tenant-environment allocated resource conforming to the first XaaS type corresponding to the first user and a low-order resource of the tenant-environment allocated resource is not changed, the resources being resources of a resource type conforming to the second XaaS type.

Figure 31:
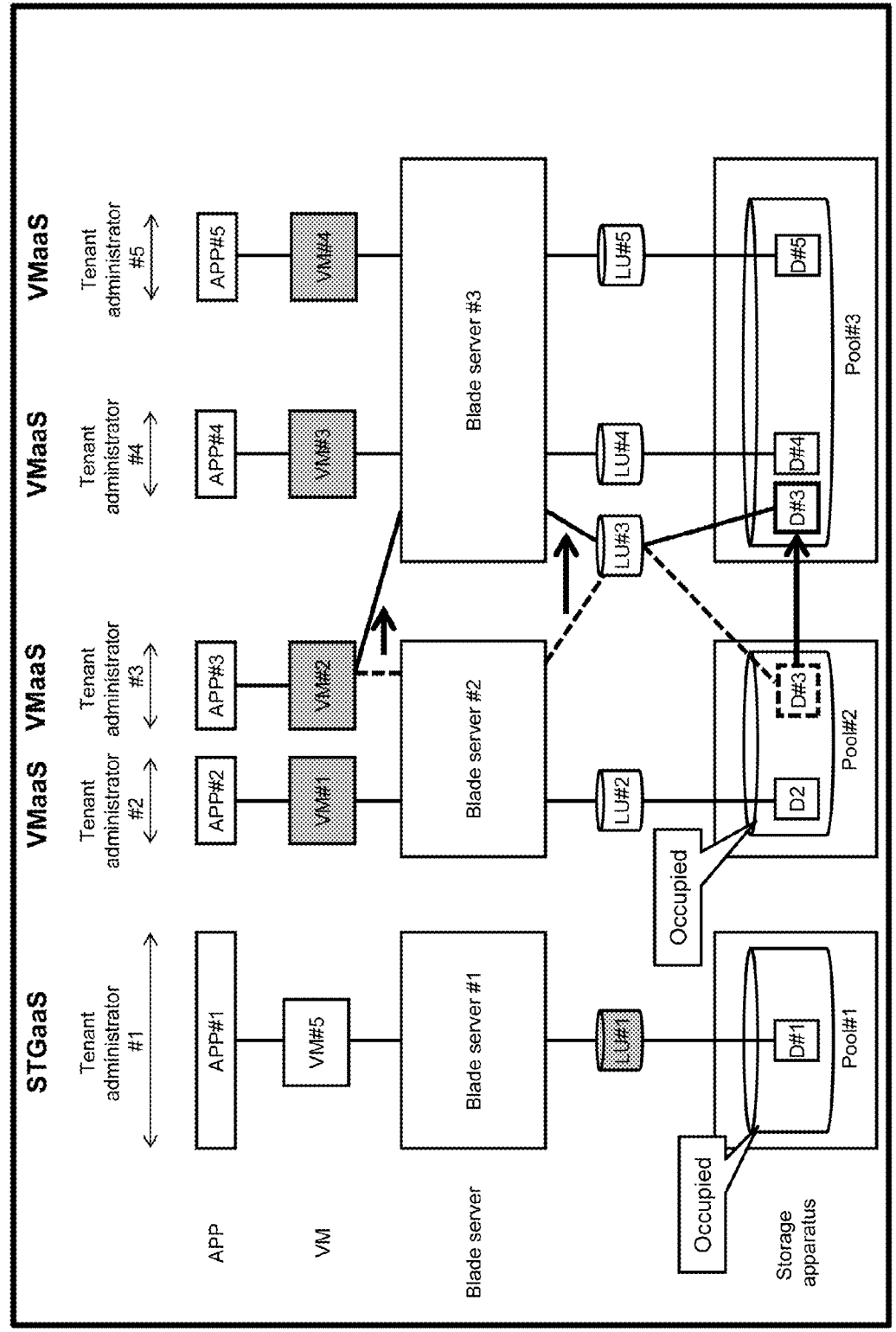
FIG. 31 shows an example of occupied resource maintenance.

FIG. 31 shows an example of occupied resource maintenance. According to an example shown in the figure, a Pool #1 is an occupied resource. All resources (an LU #1, a blade server 210 #1, and a VM #5) related to the occupied resource in terms of topology and higher in order than the occupied resource are also occupied resources.

It is assumed that a Pool #2 is changed from a shared resource (a resource corresponding to tenant administrators #2 and #) to an occupied resource (a resource corresponding to only the tenant administrator #2). The system management program 760 has to migrate data (D#3) corresponding to the tenant administrator #3 in the data in the Pool #2 to anther pool (the Pool #1 or #3).

Therefore, concerning each of the Pools #1 and #3, which are migration destination candidates, the system management program 760 specifies from the second management information 770 whether the pool is an occupied resource or a shared resource. Consequently, it is specified that the Pool #1 is an occupied resource and the Pool #3 is a shared resource. The system management program 760 migrates the D#3 to the Pool #3, which is the shared resource, (does not migrate the D#3 to the Pool #1, which is the occupied resource).

The system management program 760 changes a dependence relation among the resources such that resources higher in order than the Pool #2, which is an occupied resource, is also an occupied resource. Specifically, for example, the system management program 760 determines whether each of the resources higher in order than the Pool #2 is a shared resource and changes the resource determined as the shared resource to an occupied resource. More specifically, in order to change a blade server 210 #2 to an occupied resource, the system management program 760 changes a dependence destination of the VM #2 and a dependence source of the LU #3 from the blade server 210 #2 to a blade server 210 #3 (a shared resource). If such a change is performed between low-order resources corresponding to different tenant administrators, the system management program 760 may perform a change without an inquiry to the tenant administrator. On the other hand, if such a change affects any one of the tenant administrators (e.g., an amount of a dependence destination of a tenant-environment allocated resource changes), the system management program 760 may perform the change when the system management program 760 issues an inquiry to the affected tenant administrator and receives a reply indicating that the change is permitted. When one or more low-order resources corresponding to any one of the users are occupied, the system management program 760 of the management system 170 controls the occupied low-order resources and resources higher in order than the low-order resources not to correspond to the other users.

An example of resource securing is explained below. The system management program 760 of the management system 170 secures, on the basis of a predicted value of a resource increase amount concerning a tenant-environment allocated resource corresponding to any one of the users, a resource of the same type as a type of a low-order resource of the tenant-environment allocated resource. When detecting an event concerning any one of the tenant administrators or the tenants, if a type of a resource operated in processing conforming to the detected event corresponds to a type of a resource secured concerning the tenant administrator or the tenant, the system management program 760 of the management system 170 may preferentially allocate the secured resource to a tenant-environment allocated resource corresponding to the tenant administrator or the tenant.

In the case of the processing conforming to the request, the system management program 760 may predict a use state in future concerning a type of the resource to be the tenant-environment allocated resource (or other types). The prediction may be performed on the basis of, for example, information associated with the request (e.g., an amount of data scheduled to be stored in one month), a monitoring result in a certain period, or the like. When a resource amount conforming to the predicted use state exceeds a resource amount corresponding to the tenant, the system management program 760 may secure (reserve) one or more resources in an amount equal to or larger than a difference between the resource amounts (e.g., may register "secured (the administrator ID 2402=XXX)" as a state corresponding to the secured resource). Note that the prediction of a use state in future may be performed at timing different from timing of the processing conforming to the request, for example, periodically. Concerning a certain resource type, when a resource amount conforming to a prediction result of a use state in future is smaller than an allocated resource amount, resource release processing for reducing the allocated resource amount (processing for releasing allocation of resources to the tenant administrator) may be performed by the system management program 760.

An example of resource selection priority order is explained below.

When searching for and selecting a resource on the basis of the resource management table 2000 or the like, the system management program 760 may most preferentially search for and select a resource secured (reserved) concerning a request source tenant administrator. Priority order of an unallocated resource may be lower than priority order of the resource secured concerning the request source tenant administrator. Priority order of a shared resource among low-order resources corresponding to tenant administrators different from the request source tenant administrator may be lower than at least one of the priority order of the resource secured concerning the request source tenant administrator and the priority order of the unallocated resource. Priority order of a resource secured concerning tenant administrators different from the request source tenant administrator may be lower than the priority order of the resource secured concerning the request source tenant administrator. According to this example, for example, when both of an unallocated resource not allocated to all of the tenant administrators or the tenants and low-order resources of one or more tenant-environment allocated resources corresponding to any one of the tenant administrators or the tenants other than the first tenant administrator or the first tenant can be allocated to a tenant environment of the first tenant administrator or the first tenant as a resource allocated to the tenant environment of the first tenant administrator or the first tenant, the system management program 760 preferentially allocates the unallocated resource to the tenant environment of the first tenant administrator or the first tenant.

Figure 5:
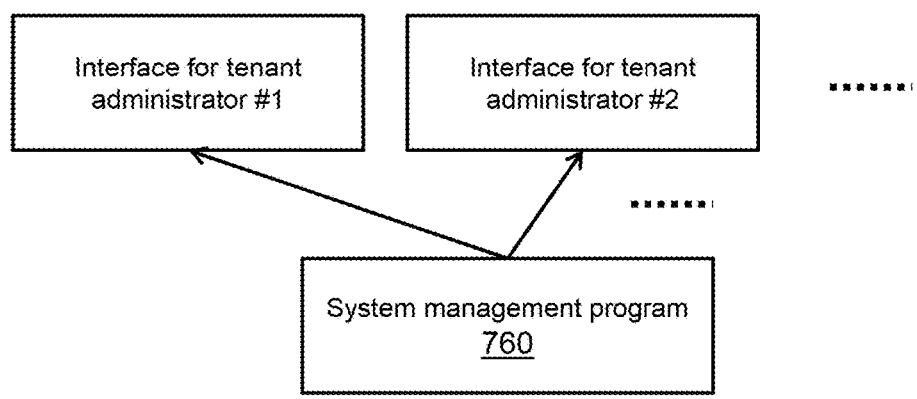
FIG. 5 shows an example of an interface provided to each of XaaS resource management servers by a system management program.

FIG. 5 shows an example of interfaces provided to each of the XaaS resource management servers 140 by the system management program 760.

The system management program 760 operates as a platform management function for providing, to each of a plurality of tenant administrators (the XaaS resource management servers 140), an interface for receiving a request from the tenant administrator, searching for a resource matching the request in response to the request, and displaying information concerning found resource. The interface to be provided is an interface corresponding to a tenant administrator at a provision destination.

Therefore, for example, when receiving a resource reference request or a resource allocation request through an interface provided to the tenant administrator #1, the system management program 760 specifies a resource corresponding to the tenant administrator #1 from at least the tenant environment management table 1900 of the tenant environment management table 1900 and the resource management table 2000 and displays information concerning the specified resource on the interface. As shown in FIG. 32, when a request is the resource reference request, the system management program 760 may include information concerning a low-order resource in the information concerning the display target. Consequently, the tenant administrator can grasp, for example, a dependence relation with the low-order resource. On the other hand, when a request is the resource allocation request, the system management program 760 may not include the information concerning the low-order resource in the information concerning the display target. Consequently, it is possible to prevent the low-order resource from being able to be operated from the tenant administrator. Note that the resource allocation request is an example of at least one of an environment construction request, a resource change request, and a service model change request.

For example, when receiving a reference request from the system administrator, the system management program 760 may specify, for each tenant administrator, a resource corresponding to the tenant administrator from at least the tenant environment management table 1900 of the tenant environment management table 1900 and the resource management table 2000 and, as shown in FIG. 33, display resource information of each tenant administrator (information concerning the specified resource).

According to such an example of display control, for example, the following holds true. That is, when receiving resource reference requests from a plurality of tenant administrators or a plurality of tenants or when receiving a resource reference request from the system administrator of the computer system, the system management program 760 determines information concerning a resource corresponding to a tenant, information being displayed to a request source, and displays the determined information to the request source. Specifically, for example, when a received request is a resource reference request from any one of the plurality of tenant administrators or the plurality of tenants, the system management program 760 does not display information concerning resources lower in order than one or more tenant-environment allocated resources corresponding to the tenant administrator or the tenant. For example, when a received request is a resource reference request from the system administrator, the system management program 760 displays, as information concerning a resource corresponding to the tenant administrator or the tenant, information concerning resources lower in order than one or more tenant-environment allocated resources corresponding to the tenant administrator or the tenant and does not display information concerning resources higher in order than the one or more tenant-environment allocated resources.

The embodiment is explained above. However, this is an illustration for the explanation of the present invention and is not meant to limit the scope of the present invention to only the embodiment. The present invention can be executed in other various forms as well.

For example, resource allocation control is performed in response to a request from the tenant administrator or the system administrator. However, instead of or in addition to the response to the request, when the tenant management program 660 or the system management program 760 detects from a monitoring result concerning a resource that the resource is in a predetermined state, the resource allocation control may be performed by the tenant management program 660 or the system management program 760.

For example, the plurality of resource management servers 140 may include two or more XaaS resource management servers 140 concerning the same XaaS (an XaaS of the same type). The common resource management server 130 may perform processing explained below. Note that, in the following explanation, "management operation" for a resource means operation for control or management concerning the resource. Specifically, there are, for example, reference to information concerning the resource, a change of a dependence relation between resources of different resource types, and the like.

The common resource management server 130 may manage a provided resource and the XaaS resource management server 140 that provides the resource in association with each other. For example, the common resource management server 130 may manage, for each XaaS resource management server 140, a resource group, which is a group of resources provided to the XaaS resource management server 140. When providing a resource not included in all of the resource groups to the XaaS resource management server 140, the common resource management server 130 may include the provided resource in a resource group corresponding to the XaaS resource management server 140 at a provision destination of the resource.

Thereafter, the common resource management server 130 may perform control (e.g., access control) for each resource group.

A first example of the control for each resource group is, for example, as explained below. That is, the common resource management server 130 may receive management operation on a resource from an administrator (typically, the tenant administrator) of any one of the XaaS resource management servers 140 on the basis of a correspondence relation between the resource and the XaaS resource management server. Specifically, for example, if a management operation target resource is a resource included in a resource group corresponding to an XaaS resource management server of the tenant administrator at the management operation source, the common resource management server 130 may receive the management operation. On the other hand, for example, if the management operation target resource is a resource not included in the resource group corresponding to the XaaS resource management server of the tenant administrator at the management operation source, the common resource management server 130 may rejects the management operation.

A second example of the control for each resource group is, for example, as explained below. That is, the common resource management server 130 may receive management operation from an administrator (typically, the system administrator) of the common resource management server irrespective of the correspondence relation.

CITATION LIST

120 computer system
130 common resource management server
140 XaaS resource management server

The invention claimed is:

1. A management system comprising:
an interface device coupled to a computer system including a plurality of resources, which includes resources of a plurality of resource types; and
a processor coupled to the interface device, wherein the processor is configured to
allocate, among the plurality of resources including the resources of the plurality of resource types, a resource of a resource type, which is different depending on a type of an X as a Service (XaaS), to a tenant environment,
provide a plurality of the tenant environments including a plurality of types of XaaSs,
manage, among the plurality of resources including the resources of the plurality of resource types, as low-order resources, resources have lower tiers in terms of topology than the resources allocated to the tenant environments, and
when receiving a change request for a resource,
execute change processing on at least one or more low-order resources among the resources managed as the low-order resources.

2. The management system according to claim 1, wherein the processor is configured to manage each of the plurality of resources of the computer system as one of following four categories for each type of XaaS: a tenant-environment allocated resource, which is a resource allocated to a particular tenant environment based on the type of XaaS, a high-order resource, which is a resource has higher tier in terms of topology than the tenant-environment allocated resource, the low-order resource, and an unallocated resource.

3. The management system according to claim 1, wherein the processor is configured to perform, as the change processing, such that performance or amounts of dependence destination resources of one or more tenant-environment allocated resources before the change processing and performance or amounts of the dependence destination resources of the one or more tenant-environment allocated resources after the change processing are the same, processing for changing a dependence relation in terms of topology between the one or more tenant-environment allocated resources and the low-order resources of the one or more tenant-environment allocated resources, wherein the dependence destination resources of the one or more tenant-environment allocated resources are resources have subsequent lower tier in terms of topology than the one or more tenant-environment allocated resources.

4. The management system according to claim 1, wherein the change processing includes processing for changing an XaaS type of any one of the tenant environments from a first XaaS type to a second XaaS type, and
the processor is configured to select, as the change processing, a resource of a resource type conforming to the second XaaS type, at least one of a first dependence relation and a second dependence relation of the resource not being changed, as a tenant-environment allocated resource for the second XaaS type, wherein the first dependence relation and the second dependence relation are referred to resource dependent relationship in terms of topology.

5. The management system according to claim 1, wherein, when the low-order resource allocated to any one of the tenant environments is occupied, the processor is configured not to cause the occupied low-order resource and a resource that has higher tier in terms of topology than the occupied low-order resource to correspond to a user other than any one of the users, wherein the low-order resource is occupied indicates the resource corresponds to only one user.

6. The management system according to claim 1, wherein the processor is configured not to operate dependence destination resources of one or more tenant-environment allocated resources corresponding to a first tenant administrator or a first tenant of a first tenant environment in response to a request from a second tenant administrator or a second tenant, which a tenant administrator or a tenant different from the first tenant administrator of the first tenant, wherein the dependence destination resources of the one or more tenant-environment allocated resources are resources have subsequent lower tier in terms of topology than the one or more tenant-environment allocated resources.

7. The management system according to claim 1, wherein the processor is configured to
secure, on the basis of a predicted value of a resource increase amount concerning a tenant-environment allocated resource corresponding to a first tenant administrator or a first tenant, a resource of a same type as a type of a low-order resource of the tenant-environment allocated resource, and
when a resource type of an operated resource corresponds to a resource type of a resource secured concerning the first tenant administrator or the first tenant, preferentially allocate the secured resource as the tenant-environment allocated resource corresponding to the first tenant administrator or the first tenant.

8. The management system according to claim 1, wherein, when, as a resource allocated to a tenant environment of a first tenant administrator or a first tenant, both of an unallocated resource that is not allocated to all of tenant administrator or tenants and low-order resources of one or more tenant-environment allocated resources corresponding to any one of the tenant administrators or the tenants other than the first tenant administrator or the first tenant can be allocated to the tenant environment of the first tenant administrator or the first tenant, the processor is configured to preferentially allocate the unallocated resource to the tenant environment of the first tenant administrator or the first tenant.

9. The management system according to claim 8, wherein when receiving a request from the first tenant administrator, the processor is configured to
if a resource operated in processing conforming to the received request is the resource allocated to the first tenant, execute the processing conforming to the request, and,
if the resource operated in the processing conforming to the received request is a resource allocated to a tenant other than the first tenant, reject the processing conforming to the request, and wherein when receiving a request from a system administrator of the computer system, the processor is configured to
execute processing based on content of processing conforming to the received request and authority allocated to the system administrator.

10. The management system according to claim 1, wherein
when receiving resource reference requests from a plurality of tenant administrators or a plurality of tenants or when receiving a resource reference request from a system administrator of the computer system, the processor is configured to
determine information concerning a resource corresponding to the tenant, the information being displayed to a request source, and displays the determined information to the request source.

11. The management system according to claim 10, wherein, when the received request is a resource reference request from any one of the plurality of tenant administrators or the plurality of tenants, the processor is configured not to display information of a resource that has lower tier in terms topology than one or more tenant-environment allocated resources corresponding to the tenant administrator or the tenant.

12. The management system according to claim 10, wherein, when the received request is a resource reference request from the system administrator, the processor is configured to display, as information concerning a resource corresponding to the tenant administrator or the tenant, information concerning a resource that has lower tier in terms of topology than one or more tenant-environment allocated resources corresponding to the tenant administrator or the tenant and not to display information concerning a resource that has higher tier in terms of topology than the one or more tenant-environment allocated resources.

13. The management system according to claim 8, wherein the processor is configured to operate as a platform management function, which is a function for searching for, with respect to each of a plurality of tenant administrators respectively corresponding to the plurality of tenants, in response to a request from the tenant administrator, a resource matching the request and displaying information concerning a found resource.

14. A management system that manages a computer system including a plurality of resources including resources of a plurality of resource types, the management system comprising:
a plurality of XaaS resource management servers corresponding to XaaSs of a plurality of types; and
a common resource management server, wherein
each of the plurality of XaaS resource management servers is configured to provide a tenant environment conforming to the XaaS corresponding to the XaaS resource management server, and the common resource management server is configured to
allocate, among the plurality of resources including the resources of the plurality of resource types, a resource of a resource type, which is different depending on a type of the XaaS, to a tenant environment corresponding to the XaaS,
manage, among the plurality of resources including the resources of the plurality of resource types, as low-order resources, resources have lower tiers in terms of topology than the resources allocated to the tenant environments, and
when receiving a change request for a resource from any one of the XaaS resource management servers, execute change processing on at least one or more low-order resources among the resources managed as the low-order resources.

15. The management system according to claim 14, wherein the plurality of XaaS resource management servers include two or more XaaS resource management servers concerning a same type of XaaS, and the common resource management server is configured to
manage a provided resource and an XaaS resource management server that provides the resource in association with each other, receive management operation on the resource from an administrator of any one of the XaaS resource management servers on the basis of a correspondence relation between the resource and the XaaS resource management server, and receive management operation from an administrator of the common resource management server irrespective of the correspondence relation.

\* \* \* \* \*